US009185031B2

(12) United States Patent
Okita

(10) Patent No.: US 9,185,031 B2
(45) Date of Patent: Nov. 10, 2015

(54) ROUTING CONTROL SYSTEM FOR L3VPN SERVICE NETWORK

(71) Applicant: HITACHI, LTD., Tokyo (JP)

(72) Inventor: Hideki Okita, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/450,368

(22) Filed: Aug. 4, 2014

(65) Prior Publication Data

US 2014/0341226 A1 Nov. 20, 2014

Related U.S. Application Data

(63) Continuation of application No. 12/542,878, filed on Aug. 18, 2009.

(30) Foreign Application Priority Data

Aug. 21, 2008 (JP) ................................. 2008-213250

(51) Int. Cl.
H04L 12/713 (2013.01)
H04L 12/26 (2006.01)
H04L 12/701 (2013.01)
H04L 12/723 (2013.01)
H04L 12/715 (2013.01)

(52) U.S. Cl.
CPC .......... *H04L 45/586* (2013.01); *H04L 43/0817* (2013.01); *H04L 43/16* (2013.01); *H04L 45/00* (2013.01); *H04L 45/50* (2013.01); *H04L 45/64* (2013.01)

(58) Field of Classification Search
CPC ... H04L 45/586; H04L 45/64; H04L 43/0817; H04L 45/50; H04L 43/16; H04L 45/00
See application file for complete search history.

(56) References Cited

U.S. PATENT DOCUMENTS

| 6,751,191 B1 | 6/2004 | Kanekar et al. |
| 7,263,555 B2 | 8/2007 | Banerjee et al. |
| 7,406,037 B2 | 7/2008 | Okita |

(Continued)

FOREIGN PATENT DOCUMENTS

| CN | 1762136 | 4/2006 |
| EP | 1460807 | 9/2004 |

(Continued)

OTHER PUBLICATIONS

E. Rosen et al., BGP/MPLS VPNs, RFC2547, Internet Engineering Task Force (IETF), Mar. 1999.

(Continued)

*Primary Examiner* — Dang Ton
*Assistant Examiner* — Mandish Randhawa
(74) *Attorney, Agent, or Firm* — Mattingly & Malur, PC

(57) ABSTRACT

A routing control system comprising a system controller and master and slave routing servers, wherein the master routing server includes a plurality of logical controllers, each of which performs routing control for each of the user networks, the system controller monitors a load state of the master routing server and migrates at least one of the plurality of logical controllers from the master routing server to the slave routing server when the load state has satisfied a predetermined condition, so that the slave routing server inherits routing control for a particular user network associated with the migrated logical controller.

18 Claims, 19 Drawing Sheets

(56) References Cited

U.S. PATENT DOCUMENTS

| | | |
|---|---|---|
| 7,684,417 B2 | 3/2010 | Imai et al. |
| 2003/0037165 A1 | 2/2003 | Shinomiya |
| 2004/0221065 A1 | 11/2004 | Banerjee et al. |
| 2006/0077922 A1 | 4/2006 | Geilfus et al. |
| 2006/0092971 A1 | 5/2006 | Okita et al. |
| 2008/0065783 A1 | 3/2008 | Iloglu et al. |
| 2008/0198849 A1 | 8/2008 | Guichard et al. |

FOREIGN PATENT DOCUMENTS

| | | |
|---|---|---|
| JP | 2005-303501 A | 10/2005 |
| JP | 2006-129213 A | 5/2006 |
| JP | 2006-135686 A | 5/2006 |
| WO | 2004/084499 | 9/2004 |
| WO | 2005/083569 | 9/2005 |

OTHER PUBLICATIONS

Jen-Hao Kuo et al., An Evaluation of the Virtual Router Redundancy Protocol Extension with Load Balancing, Dependable Computing, 2005, Proceedings., 11th Pacific Rim International Symposium on Changsha, Hunan, China, Dec. 12-14, 2005, XP010902823, Dec. 12, 2005, pp. 133-139, Piscataway, NJ, USA.

SYSTEM CONTROLLER 50

ROUTING SERVER MANAGEMENT TABLE 550

| VPN ID | ROUTING SERVER ID | LOGICAL CONTROLLER ADDRESS | |
|---|---|---|---|
| a | 1 | 192.168.99.101 | EN-a |
| b | 1 | 192.168.99.102 | EN-b |
| c | 1 | 192.168.99.103 | EN-c |
| ⋮ | ⋮ | ⋮ | |

SERVER RESOURCE MANAGEMENT TABLE 540

| ROUTING SERVER ID 541 | TOTAL RESOURCES 542 | ALLOCATED RESOURCES 543 | CPU UTILIZATION RATE FOR EACH LOGICAL CONTROLLER 544 | | |
|---|---|---|---|---|---|
| 1 | 100 | 90 | 1 (50) | 2 (30) | 3 (10) |
| 2 | 100 | 0 | — | — | — |
| ⋮ | ⋮ | ⋮ | | | |

EDGE NODE 10

ROUTING CONTROL PACKET 100

ROUTE INFORMATION FORWARDING PACKET 110

FIG. 18

LOAD INFORMATION NOTIFICATION PACKET 120

| SOURCE NODE ID : 1 | | | | |
|---|---|---|---|---|
| INTERFACE ID | PROTOCOL TYPE | INPUT COUNT | OUTPUT COUNT | |
| VLAN001 | OSPF | 10010 | 15 | |
| | HTTP | 105 | 105 | |
| VLAN002 | OSPF | 10010 | 15 | |
| | HTTP | 105 | 105 | |
| ⋮ | ⋮ | ⋮ | ⋮ | |

USER NETWORK DESTINATION MANAGEMENT TABLE 530

| INTERFACE ID (531) | PHYSICAL PORT ID (532) | LOGICAL CONTROLLER ID (533) | VPN ID (534) |
|---|---|---|---|
| VLAN001 | Ether001 | 1 | a |
| VLAN002 | Ether001 | 2 | b |
| Ether002 | Ether002 | 3 | c |
| | | | |

FIG. 23A

USER MANAGEMENT TABLE 170

| VPN ID | ROUTING SERVER IP ADDRESS | USER NODE CONNECTION PORT ID | |
|---|---|---|---|
| a | 192.168.99.1 | 0 | ～ EN-01 |
| b | 192.168.99.1 | 1 | ～ EN-02 |
| c | 192.168.99.1 | 2 | ～ EN-03 |
| ⋮ | ⋮ | ⋮ | |

FIG. 23B

USER MANAGEMENT TABLE 170

| VPN ID | ROUTING SERVER IP ADDRESS | USER NODE CONNECTION PORT ID | |
|---|---|---|---|
| a | 192.168.99.1 | 0 | ～ EN-01 |
| b | 192.168.100.1 | 1 | ～ EN-02 |
| c | 192.168.100.1 | 2 | ～ EN-03 |
| ⋮ | ⋮ | ⋮ | |

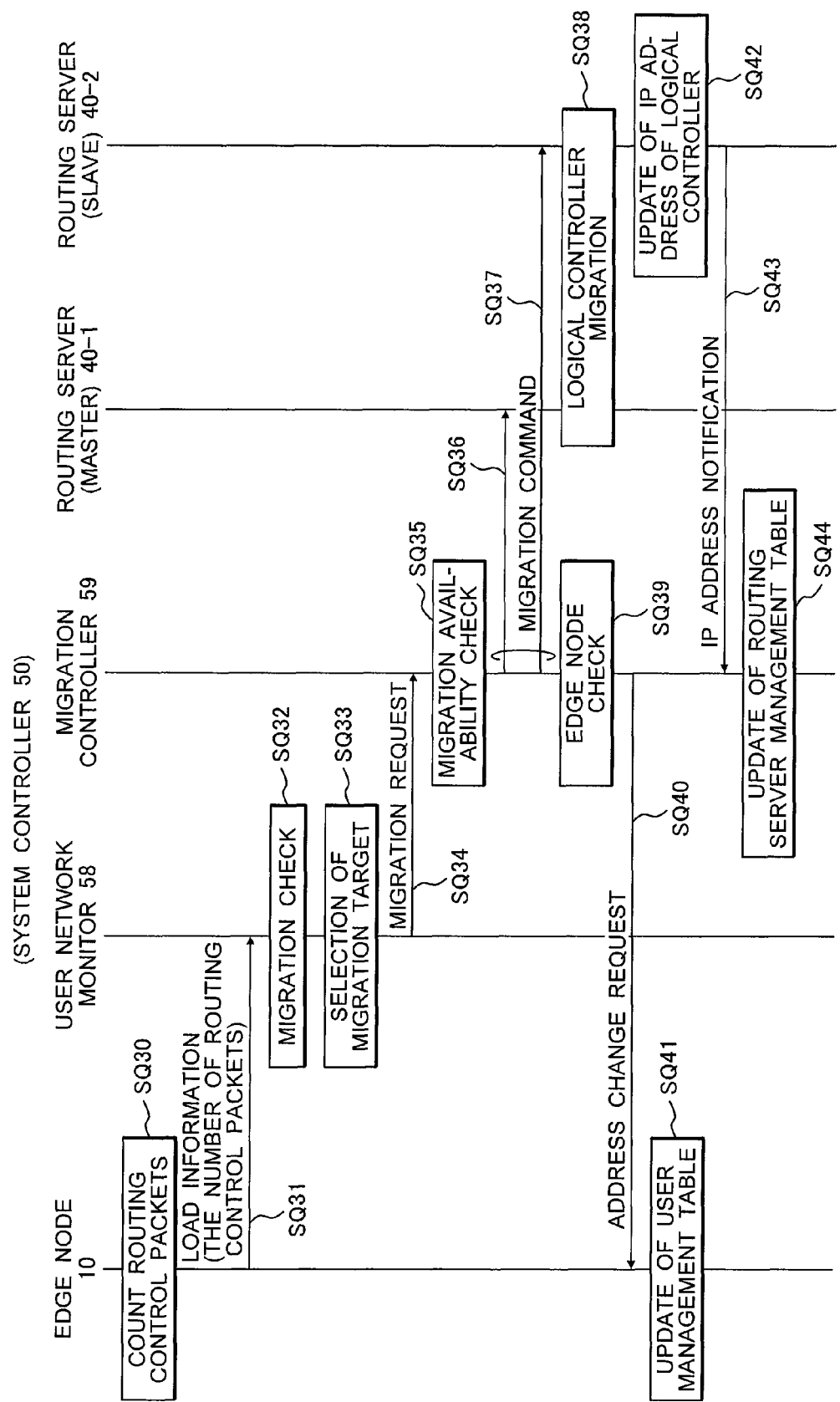

ROUTING CONTROL SYSTEM FOR L3VPN SERVICE NETWORK

CLAIM OF PRIORITY

This is a continuation application of U.S. application Ser. No. 12/542,878, filed Aug. 18, 2009 which claims priority from Japanese patent application JP 2008-213250, filed on Aug. 21, 2008, the content of all applications are hereby incorporated by reference.

BACKGROUND OF THE INVENTION (1) Field of the Invention

The present invention relates to a routing control system and, more particularly, to a routing control system that is suitable for a Layer 3 Virtual Private Network (L3VPN) accommodating a plurality of customer or user networks.

(2) Description of Related Art

An IP network system is composed of a plurality of communication nodes such as routers and switches. Each communication node is provided with a packet transport function unit for switching packets among a plurality of line interfaces and a control function unit connected to the packet transport function unit. Each communication node updates its route information table maintained thereon by communicating route information with the other communication nodes, using a distributive routing protocol such as OSPF (Open Shortest Path First), BGP (Broader Gateway Protocol), or the like.

For a network system in which a distributive routing protocol is applied, the reliability of the control function unit of each communication node influences the stability of the entire network. For example, if a malfunction occurs in one of the communication nodes due to a coding error in a control program or a shortage of memory capacity, this malfunction has an impact on routing control across the entire network system and may give rise to disrupted communication on a particular route according to circumstances.

For such a distributive routing based network, a network control scheme called C/U (Control plane/User plane) separation is under study. This network control scheme separates the routing function from the IP packet transport function of routers in an IP network. An example of the C/U separation scheme is provision of a server called a route server for intensively handling route control in the IP network. The route server collectively calculates route information for every communication node in the network when a link status changes in the IP network and distributes optimum route information to each communication node. According to this control scheme, it is possible to reduce the necessary time for route optimization, by notifying link status changes from each node to the route server so that the route server intensively controls routes in the network.

Meanwhile, communication carriers provide various types of private communication networks (VPNs: Virtual Private Networks) as wide area connection services instead of traditional dedicated line services. In such a VPN service, because a plurality of customers can share network resources provided by a carrier, each carrier can offer communication services to a larger number of customers at a lower price with reduced infrastructure investment cost.

One of the VPN services provided by a carrier is an L3 (Layer 3) VPN service that provides virtual IP networks to multiple customers. The L3VPN service can be implemented in several ways and a representative one is a peer-to-peer communication system using MPLS/BGP (Multi-Protocol Label Switching/Broader Gateway Protocol), e.g., described in "BGP/MPLS VPNs" RFC2547, Internet Engineering Task Force (IETF), March 1999 (Non-Patent Document 1). As other implementations, for example, an overlay type using IPsec, a separation type employing virtual routers, etc. are known.

In order to improve communication reliability in the VPN services, a technique to recover the communication by path switching when a route failure occurs is known, for example, as disclosed in Japanese Unexamined Patent Publication No. 2006-135686 (Patent Document 1). By adopting the path switching technique, in the case where disconnection of a communication line or a fault in a communication node occurs, communication over the VPN via the faulty line or faulty node can be recovered.

In one of the L3VPN services, a routing control interface at a network edge is prescribed so that the carrier network can be seen as a single router from each user network (customer network). In this case, each of the routers in the user networks can communicate route information with a routing system located in the carrier network in accordance with a routing protocol such as OSPF or RIP. According to this architecture, each user can reduce management cost because all route information for the VPN provided by the carrier and a plurality of access points connected to the VPN can be managed by a single routing protocol.

In a case where a carrier builds a routing system for L3VPN service by employing the above-mentioned route server, in order to improve the reliability of communication service and the performance of system management, and opens the routing protocol interface of the route server to the respective routers in the user networks, the route server (routing system) has to be provided with the following functions of:

(1) collecting routing control packets from each router in the user networks;

(2) VPN route information management for managing route information for each user network;

(3) VPN routing control for calculating route information for each user network; and (4) route information distribution for converting route information for each user network into route information in the carrier network and reflecting the route information to each router in the user networks.

In a case where a plurality of user networks are connected to a single network, e.g., an L3VPN service network provided by the carrier and routing control for the user networks is performed by a route server, the carrier has to operate the routing system (route server) so that route setup requests issued from the user networks do not interfere with each other. However, when a plurality of user networks are connected to the L3VPN service network, the load of the routing system increases on account of various factors.

If a new customer joins in the L3VPN service, for example, the load of the routing system increases because of an increase in the number of networks to be controlled. Further, if a loop has occurred in an Ethernet (registered trademark) serving as a user network due to incorrect cable connection, for example, there is a risk that a storm of routing control packets (routing requests) transmitted from routers in the user network may occur. In this case, a burst of routing control packets not foreseen by the routing protocol will be transmitted into the routing system (route server), thereby causing a surge in the processing load on the route server.

Failure having occurred in one of the routers in the user networks and bugs involved in routing control software running on the router may result in a burst of routing control packets. In a communication network in which a routing protocol such as OSPF or RIP is applied, when reception of keep-alive packets from a neighboring router ceases, each router recalculates a route according to the routing protocol and advertises updated route information to other routers in the network. In this case, if a failed router performs routing control in a sequence different from the other routers, there is a possibility of no convergence of route calculation in the network. Transmission of a burst of routing control packets from a user network by a malicious user also causes a surge in the load on the route server.

SUMMARY OF THE INVENTION

An object of the present invention is to provide a routing control system that prevents negative impact of an increased routing control load for a particular user network from affecting routing control for the other user networks in an L3VPN service network wherein routing control is performed by routing servers.

In order to accomplish the above object, the present invention provides a routing control system to be located in an L3VPN service network connected to a plurality of user networks, comprising a system controller, a master routing server, and a slave routing server, wherein the master routing server includes a plurality of logical controllers, each of which is associated with one of the plurality of user networks to perform routing control for the user network, wherein the system controller monitors a load state of the master routing server and migrates at least one logical controller selected out of the plurality of logical controllers operating on the master routing server from the master routing server to the slave routing server when the load state has satisfied a predetermined condition, so that the slave routing server inherits routing control for a particular user network associated with the migrated logical controller by activating the logical controller. Here, each of the logical controllers is provided with the above-mentioned VPN route information management function and VPN route information calculation function.

According to the present invention, a routing server is configured so as to perform routing control by a plurality of individual logical controllers, each of which is associated with a specific one of user networks. Therefore, when an extraordinary number of routing requests occur in a particular user network, the system controller can migrate a logical controller from the master routing server to the slave routing server so as to reduce the load of the master routing server and to avoid impact on other user networks.

More specifically, the routing control system of the present invention is characterized by that the system controller includes a migration controller which issues migration commands for the selected logical controller to the master routing server and the slave routing server, and in response to the migration commands from the migration controller, the master routing server transfers the selected logical controller to the slave routing server and the slave routing server activates the logical controller to inherit routing control for the particular user network.

In one exemplary embodiment of the present invention, the system controller includes a CPU load monitor which obtains CPU load information from the master routing server to determine whether the CPU load has reached a predefined threshold value, and when the CPU load has reached the predefined threshold value, the CPU load monitor selects at least one logical controller out of the plurality of logical controllers operating on the master routing server and issues a migration request for the selected logical controller to the migration controller.

In the routing control system of the present invention, the system controller may include, alternative to or in addition to the above CPU load monitor, a routing control packet monitor which obtains load information including the amount of routing control packets for each of said logical controllers from the master routing server to determine whether there exists a logical controller for which the amount of routing control packets has reached a predefined threshold value. When the amount of routing control packets of any logical controller has reached the predefined threshold value, the routing control packet monitor selects at least one logical controller out of the plurality of logical controllers operating on the master routing server and issues a migration request for the selected logical controller to the migration controller.

In another exemplary embodiment of the present invention, the system controller obtains load information indicating the amount of routing control packets from edge nodes to which the user networks are connected and migrates at least one logical controller selected out of the plurality of logical controllers operating on the master routing server from the master routing server to the slave routing server when the amount of routing control packets has satisfied a predetermined condition, and the slave routing server inherits routing control for a particular user network associated with the migrated logical controller by activating the logical controller.

In this case, the system controller may include, for example, a user network monitor which obtains load information indicating the amount of routing control packets from the edge nodes to determine whether the amount of routing control packets has reached a predefined threshold value, and the user network monitor selects at least one logical controller out of the plurality of logical controllers operating on the master routing server and issues a migration request for the selected logical controller to the migration controller when the amount of routing control packets has reached a predefined threshold value.

According to the present invention, when the processing load of the routing server increases due to a larger number of routing control packets (routing requests) transmitted from a particular user network, it becomes possible to avoid impact on the other user networks by migrating at least one of the logical controllers from the master routing server to the slave routing server.

BRIEF DESCRIPTION OF THE DRAWINGS

FIG. 18 shows an example of a format of a load information notification packet 120 to be transmitted from an edge node 10 to the system controller 50;

FIG. 19 shows an example of a structure of a user network destination management table 530 to be referred to by the user network monitor 58;

FIG. 23A and FIG. 23B illustrate the contents of a user management table 170 provided in the edge node 10; and FIG. 24 is a sequence diagram illustrating the migration of a logical controller in the communication network of the second embodiment.

DETAILED DESCRIPTION OF PREFERRED EMBODIMENTS

Exemplary embodiments of the present invention will be described hereinafter with reference to the drawings.

First Embodiment

Figure 1:
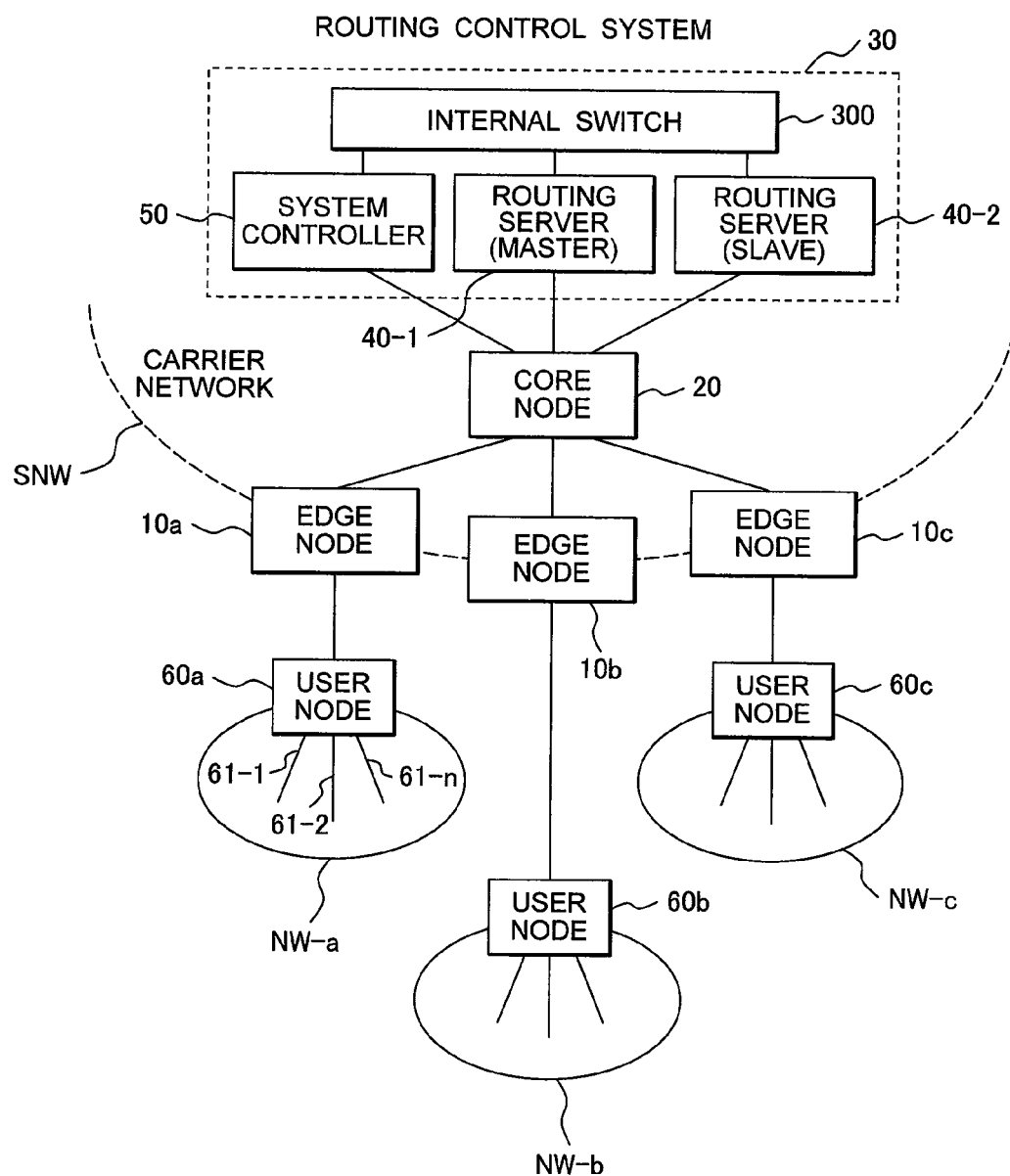
FIG. 1 shows a first embodiment of a communication network to which the present invention is applied.

FIG. 1 shows a first embodiment of a communication network to which the present invention is applied.

The communication network of the first embodiment comprises a carrier network SNW which provides L3VPN service and a plurality of user (or customer) networks NW (NW-a, NW-b, NWc, and so forth). The carrier network SNW includes a plurality of edge nodes 10 (10a, 10b, 10c, and so forth), each of which accommodates one of the user networks, and a core node 20 for connecting the edge nodes. Each user network NW comprises a node equipment (hereinafter referred to as a user node) 60 (60a, 60b, 60c, and so forth) and one or more segments 61 (61-1, 61-2, ... 61-n) connected to the user node 60.

In the embodiment, the carrier network SNW is provided with a routing control system 30 for intensively handling routing control across the communication network. The routing control system 30 comprises a plurality of routing servers 40 (40-1, 40-2, and so forth) each of which performs optimum route calculation, route information management and route information distribution, and a system controller 50. In the embodiment, the routing control system 30 is provided with a master routing server 40-1 and a slave routing server 40-2. Switching from the master to the slave is performed in units of logical controller by the system controller 50.

Each logical controller is provided with a VPN route information management function and a VPN route information calculation function. On the master routing server 40-1, a plurality of logical controllers corresponding to the user networks NWs are operating. In the first embodiment, when the load on the master routing server 40-1 has increased, the system controller 50 migrates a part of the logical controllers from the master routing server 40-1 to the slave routing server 40-2, so that the load of routing control processing is distributed to the master routing server and the slave routing server.

In the first embodiment shown in FIG. 1, the system controller 50 is connected to both the master and slave routing servers 40-1, 40-2 via an internal switch 300 of the routing control system 30. Communication between the system controller 50 and each routing server and migration of logical controllers from the master routing server 40-1 to the slave routing server 40-2 are carried out via the internal switch 300, but these operations may be carried out via the core node 20.

Figure 2:
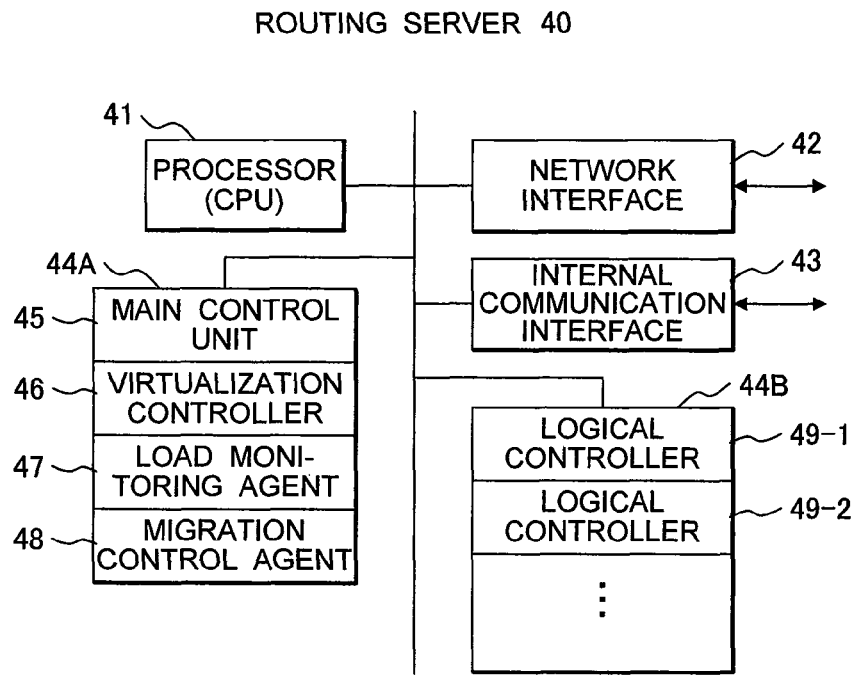
FIG. 2 shows an example of a structure of a routing server 40.

FIG. 2 shows an example of a structure of a routing server 40 (40-1, 40-2).

The routing server 40 comprises a processor (CPU) 41, a network interface 42 for communicating with the core node 20, an internal communication interface 43 for communicating with the system controller 50 and the other routing server via the internal switch 300, and memories 44A and 44B.

The memory 44A stores a main control unit 45, a virtualization controller 46, a load monitoring agent 47, and a migration control agent 48 which are provided as programs relevant to the present invention to be executed by the processor 41. The memory 44B stores a plurality of logical controllers 49 (49-1, 49-2, and so forth) for implementing control server functions independent for each user network.

The virtualization controller 46 makes each of the logical controllers 49 function as a logical control server according to the communication status of each user network, by controlling CPU resources, memory resources, and communication line resources to be allocated to each logical controller 49. The load monitoring agent 47 monitors the CPU load of the routing server 40 and the CPU load for each logical controller 49 and notifies the system controller 50 of the monitoring results periodically. The migration control agent 48 controls the start and stop of a specific one of the logical controllers 49 and its migration between the routing servers, in accordance with a command from the system controller 50.

Figure 3:
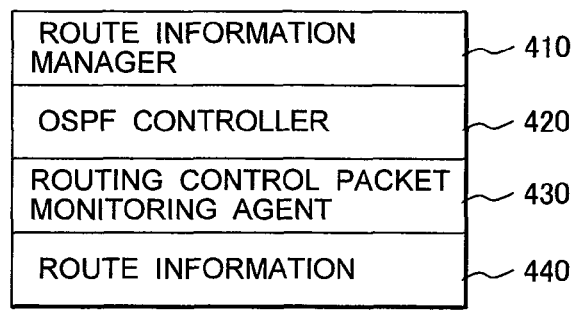
FIG. 3 shows an example of a structure of a logical controller 49 provided in the routing server 40.

As shown in FIG. 3, each logical controller 49 comprises a route information manager 410, an OSPF controller 420 for calculating a route in accordance with an OSPF protocol, a routing control packet monitoring agent 430 for monitoring input and output amount of routing control packets and notifying the system controller 50 of the monitoring results, and a route information file (route table) 440. Each logical controller 49 handles routing control packets received from a certain user network associated with it in advance to manage the route information for each user network. Here, the route information manager 410 corresponds to the above-mentioned VPN route information management function and the OSPF controller 420 corresponds to the VPN route information calculation function.

Figures 4, 5:
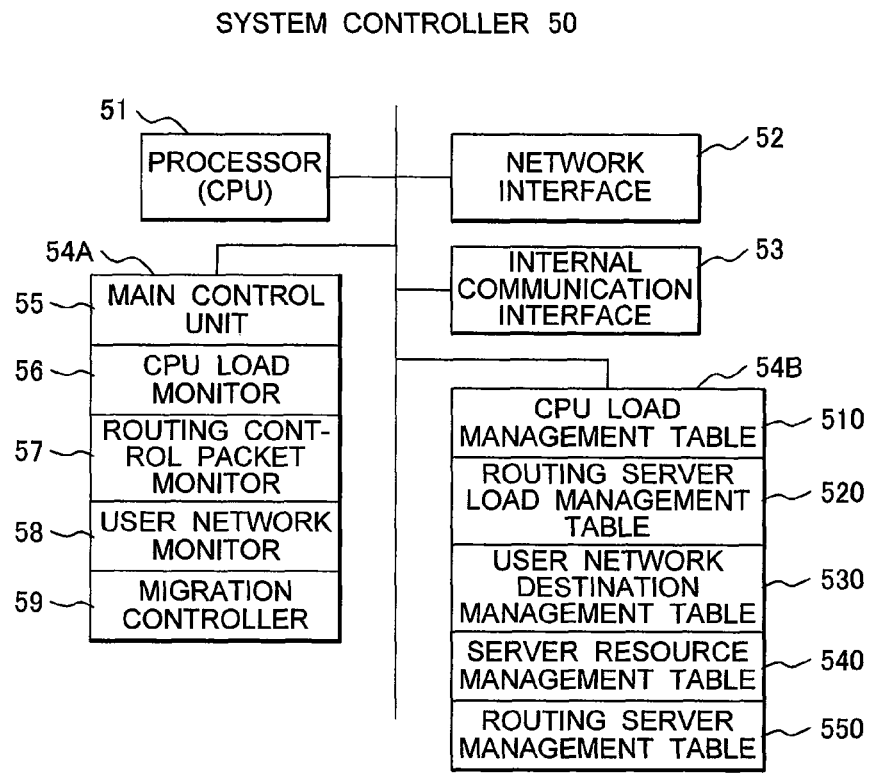
FIG. 4 shows an example of a structure of a system controller 50.
FIG. 5 shows an embodiment of a routing server management table 550 provided in the system controller 50.

FIG. 4 shows an example of a structure of the system controller 50.

The system controller 50 comprises a processor (CPU) 51, a network interface 52 for communicating with the core node 20, an internal communication interface 53 for communicating with the routing servers 40 via the internal switch 300, and memories 54A and 54B. The memory 54A stores a main control unit 55, a CPU load monitor 56, a routing control packet monitor 57, a user network monitor 58, and a migration controller 59 which are provided as programs relevant to the present invention to be executed by the processor 51. The memory 54B stores a CPU load management table 510, a routing server load management table 520, a user network destination management table 530, a server resource management table 540, and a routing server management table 550.

The CPU load monitor 56 monitors the CPU load of each logical controller 49 running on the routing server 40 by using the CPU load management table 510, and detects a logical controller 49 to be moved from the master routing server to the slave routing server by migration. When the CPU load monitor 56 detects a logical controller 49 whose CPU load has exceeded a predefined threshold value, for example, the CPU load monitor 56 selects one or more logical controllers to be moved to the slave routing server and issues a migration request to the migration controller 59.

The routing control packet monitor 57 monitors the amount of routing control packets transmitted and received between each of the logical controllers 49 on the routing server 40 and the user network, by using the routing server load management table 520, and detects a logical controller 49 to be moved from the master routing server to the slave routing server. When the routing control packet monitor 57 detects a logical controller 49 for which the amount of transmitted and received routing control packets has exceeded a predefined threshold value, for example, the routing control packet monitor 57 selects one or more logical controllers to be moved to the slave routing server and issues a migration request to the migration controller 59.

The user network monitor 58 monitors the amount of routing control packets transmitted and received between the edge nodes 10 and the user network NW, by using the user network destination management table 530, and detects a logical controller 49 to be moved from the master routing server to the slave routing server. When the user network monitor 58 detects a logical controller 49 for which the amount of transmitted and received routing control packets has exceeded a predefined threshold value, for example, the user network monitor 58 selects one or more logical controllers to be moved to the slave routing server and issues a migration request to the migration controller 59.

Upon receiving a migration request from the CPU load monitor 56, the routing control packet monitor 57 or the user network monitor 58, the migration controller 59 determines whether the logical controller specified by the migration request is allowed to migrate from the master routing server to the slave routing server, by referring to the server resource management table 540 and the routing server management table 550.

When the logical controller is allowed to migrate to the slave routing server, the migration controller 59 issues migration commands for performing migration in units of logical controller to the master routing server 40-1 and the slave routing server 40-2. By the migration commands, the migration control agent 48 in each routing server is instructed to stop or start the logical controller specified as a migration target, and the logical controller (a software structure shown in FIG. 3) is migrated from the master routing server 40-1 to the slave routing server 40-2 and the logical controller is activated on the slave routing server 40-2.

The server resource management table 540 stores the utilization status of CPU resources on the master routing server 40-1 and the slave routing server 40-2. The routing server management table 550 stores information about logical controllers 49 operating on the master routing server and the slave routing server.

FIG. 5 exemplifies an embodiment of the routing server management table 550 provided in the system controller 50.

The routing server management table 550 comprises a plurality of table entries, each table entry indicating the relation among the identifier (VPN ID) of each user network 551 connected to the carrier network SNW, the identifier (routing server ID) of the routing server 40 (40-1 or 40-2) 552, and an IP address 553 as a logical controller address assigned to the logical controller 49 operating on the routing server 40.

The routing server management table 550 shown here indicates that three user networks (NW-a, NW-b and NW-c) having VPN IDs "a", "b" and "c" are connected to the carrier network SNW.

A table entry EN-a indicates that a user network (NW-a) having VPN ID="a" is controlled by a logical controller 49-1 having an IP address of "192.168.99.101" which is operating on the routing server (master routing server 40-1) having the routing server ID=1. A table entry EN-b indicates that a user network (NW-b) having VPN ID="b" is controlled by a logical controller 49-2 having an IP address of "192.168.99.102" which is operating on the routing server (master routing server 40-1) having the routing server ID=1.

Moreover, a table entry EN-c indicates that a user network (NW-c) having VPN ID="c" is controlled by a logical controller 49-3 having an IP address of "192.168.99.103" which is operating on the routing server (master routing server 40-1) having the routing server ID=1. Here, if the logical controller 49-3 has migrated from the master routing server 40-1 to the slave routing server 40-2, for example, the value of routing server ID 552 in the table entry EN-c is changed from "1" to "2".

Figures 6, 7:
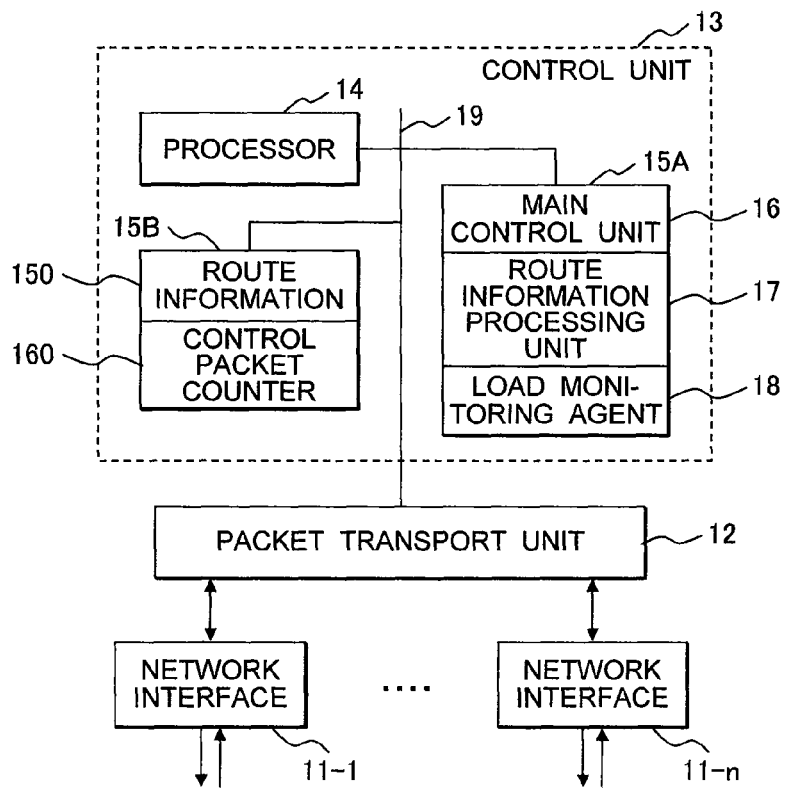
FIG. 6 shows an embodiment of a server resource management table 540 provided in the system controller 50.
FIG. 7 shows an example of a structure of an edge node 10.

FIG. 6 shows an embodiment of the server resource management table 540 provided in the system controller 50.

The server resource management table 540 comprises a plurality of table entries each corresponding to a routing server ID 541. Each table entry indicates total resources 542 representing a total amount of CPU resources available in a routing server (the master or slave routing server in this embodiment) having the routing server ID 541, allocated resources 543 representing the amount of CPU resources already allocated to logical controllers 49 in the routing server, and CPU utilization rate 544 for each logical controller. The CPU utilization rate 544 for each logical controller is expressed by pairs of the ID of the logical controller and its CPU utilization rate. In FIG. 6, the logical controller ID is represented by a serial number for simplification purposes and CPU utilization rate is shown in parentheses. Alternatively, the logical controller address as shown in FIG. 5 can be used as the logical controller ID.

The server resource management table 540 shown here indicates that: the amount of CPU resources is "100" for both the master routing server 40-1 and the slave routing server 40-2; "90" of the CPU resources has been already allocated to three logical controllers 49 in the master routing server 40-1; no logical controller operates and no CPU resources are allocated to the logical controllers in the slave routing server 40-2.

FIG. 7 shows an example of a structure of an edge node 10.

The edge node 10 comprises a plurality of network interfaces 11 (11-1 to 11-n), a packet transport unit 12 connected to these network interfaces 11, and a control unit 13 connected to the packet transport unit 12. The control unit 13 comprises a processor 14 and memories 15A and 15B. The memory 15A stores a main control unit 16, a route information processing unit 17, and a load monitoring agent 18 which are provided as programs relevant to the present invention to be executed by the processor 14. The memory 15B stores a route information file 150 and a control packet counter 160.

The route information processing unit 17 updates the route information file 150 in accordance with a command from the routing server 40 associated with the edge node 10. The load monitoring agent 18 counts the number of routing control packets communicated with the user node in the user network for a given period of time by means of the control packet counter 160 and periodically notifies the system controller 50 in the routing control system 30 of the amount of the routing control packets.

Figure 8:
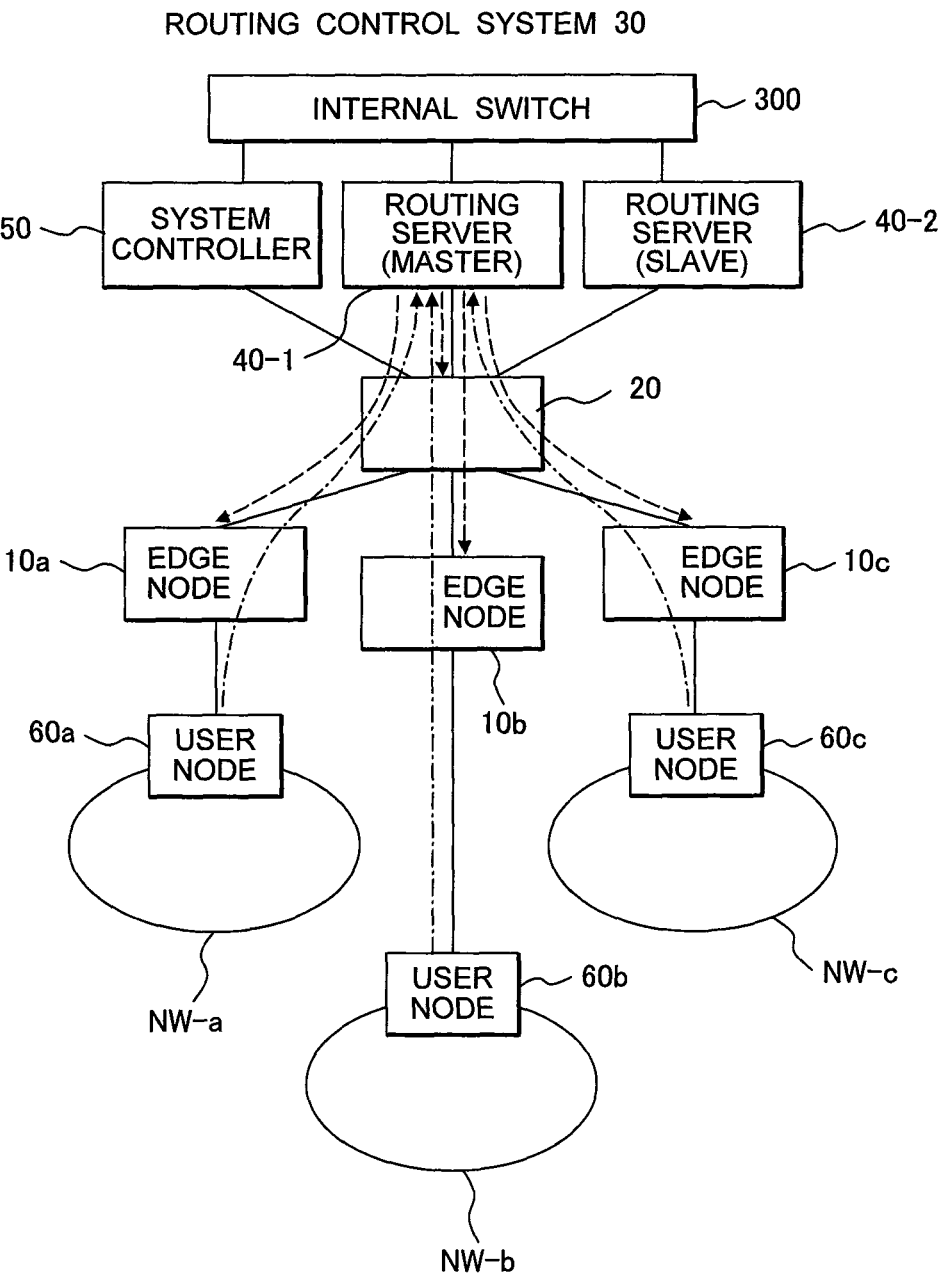
FIG. 8 illustrates flows of routing control packets in the communication network shown in FIG. 1.

FIG. 8 illustrates flows of routing control packets in the communication network shown in FIG. 1.

The user node 60 (60a to 60c) of user network generates a routing control packet (routing request) indicating configuration change of the user network, for example, when a new segment (link) is added to the user network. This routing control packet is transmitted to the routing server 40-1 operating as the master, as denoted by a dashed-dotted line, in accordance with a routing protocol prescribed by service specifications of the carrier.

Upon receiving the routing control packet from the user node 60, the master routing server 40-1 (the corresponding logical controller 49) calculates route information in each node (router) within the carrier network SNW, according to a given route calculation algorithm defined by the routing protocol. New route information is distributed from the master routing server 40-1 to each node in the carrier network SNW, as denoted by a dashed line.

In a state where a certain logical controller 49 has migrated to the slave routing server 40-2, routing control packets from a particular user network corresponding to the logical controller are forwarded to the slave routing server 40-2.

Figure 9:
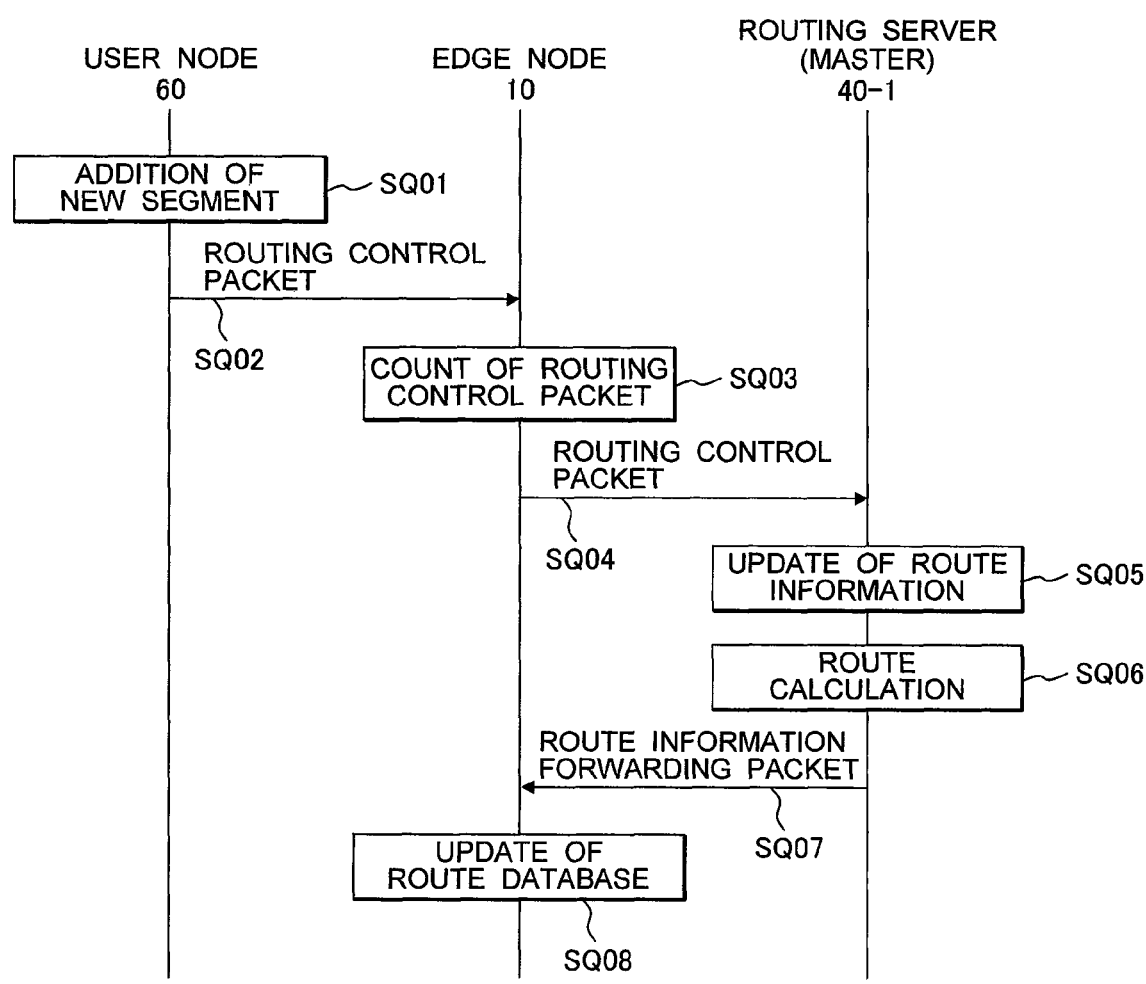
FIG. 9 illustrates a basic sequence for updating route information in the communication network of the present invention.

FIG. 9 shows a basic sequence for updating route information in the communication network of the present invention.

For example, when a new segment is added to a certain user network (SQ01), a routing control packet including control information on the new segment to be served is transmitted from the user node 60 of the user network to the corresponding edge node 10 (SQ02). Upon receiving the routing control packet, the edge node 10 updates the count value of the control packet counter (SQ03) and forwards the received routing control packet to the master routing server 40-1 (SQ04).

The master routing server 40-1 updates the route information file (SQ05) based on the control information specified in the routing control packet, and calculates a new route between the core node and the edge node in the carrier network (SQ06). The master routing server 40-1 distributes the route information indicating the new route to the core node 20 and the edge node 10 by a route information forwarding packet (SQ07). The core node 20 and the edge node 10 update the route database (route table) according to the new route information (SQ08) and start the forwarding service of packets to be communicated through the new segment added to the user network.

Figure 10:
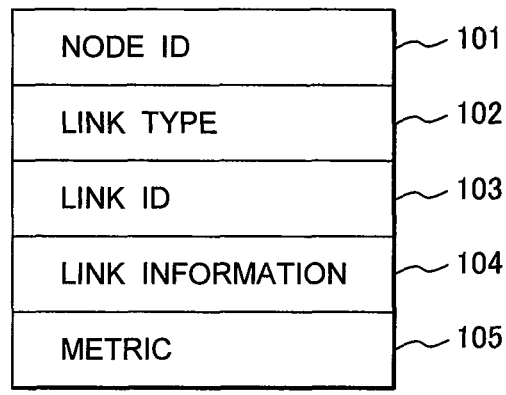
FIG. 10 shows an example of a format of a routing control packet 100 to be transmitted from a user node 60 to an edge node 10.

FIG. 10 shows an example of a format of a routing control packet 100 to be transmitted from the user node 60 to the edge node 10.

The routing control packet 100 to be transmitted from the user node 60 when a new segment was added includes a node ID 101 indicating the source node of the routing control packet, link type 102 indicating the type of link accommodating the new segment, a link ID 103 uniquely assigned to the link, link information 104 indicating IP information of the new segment, and metric 105 indicating weight information for the link.

Figure 11:
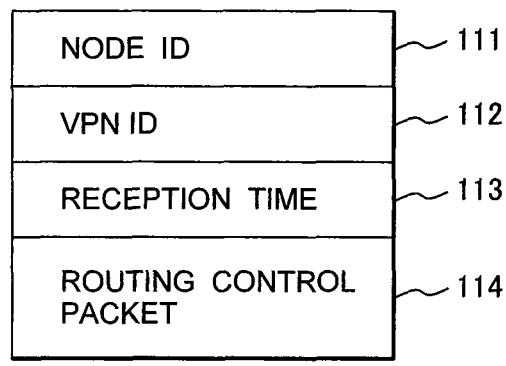
FIG. 11 shows an example of a format of a routing control packet 110 to be forwarded from the edge node 10 to the routing server 40-1.

FIG. 11 shows an example of a format of a routing control packet 110 to be forwarded from the edge node 10 to the routing server 40-1.

The routing control packet 110 includes the routing control packet 100 received from the user node 60 in its payload 114. The payload 114 is preceded by header information including the identifier (node ID 111) of the edge node which is the source of the received routing control packet 110, VPN ID 112 assigned to the user network to which the source user node 60 of the routing control packet 100 belongs, and reception time 113 at which the edge node 10 has received the routing control packet 100.

In the routing control system 30 shown in FIG. 1, the master routing server 40-1 and the slave routing server 40-2 notify the CPU load monitor 56 and the routing control packet monitor 57 in the system controller 50 of the CPU load information and the amount of input and output routing control packets counted at the servers. Each edge node 10 notifies the user network monitor 58 in the system controller 50 of the amount of input and output routing control packets counted at the node.

When the CPU load information or the amount of input and output routing control packets is notified, each of the CPU load monitor 56, routing control packet monitor 57, and user network monitor 58 in the system controller 50 checks whether a condition for switching from the master routing server to the slave routing server is satisfied for a particular logical controller. If the switching condition is satisfied at one of the monitors, the monitor selects at least one logical controller to be a migration target and issues a migration request to the migration controller 59. As the migration target, the particular logical controller for which the switching condition is satisfied is selected. Alternatively, at least one of the other logical controllers may be selected as the migration target.

Upon receiving the migration request, the migration controller 59 determines whether the migration of the logical controller specified by the migration request is allowed or not. If it is determined that the logical controller can migrate to the slave routing server, the migration controller 59 issues a migration command for the target logical controller to the master routing server 40-1 and the slave routing server 40-2. For example, in the case where only one logical controller is operating on the master routing server, or if the memory space in the slave routing server is not sufficient to accept the migration of a new logical controller, the migration controller 59 determines that the target logical controller should not migrate to the slave routing server.

Figure 12:
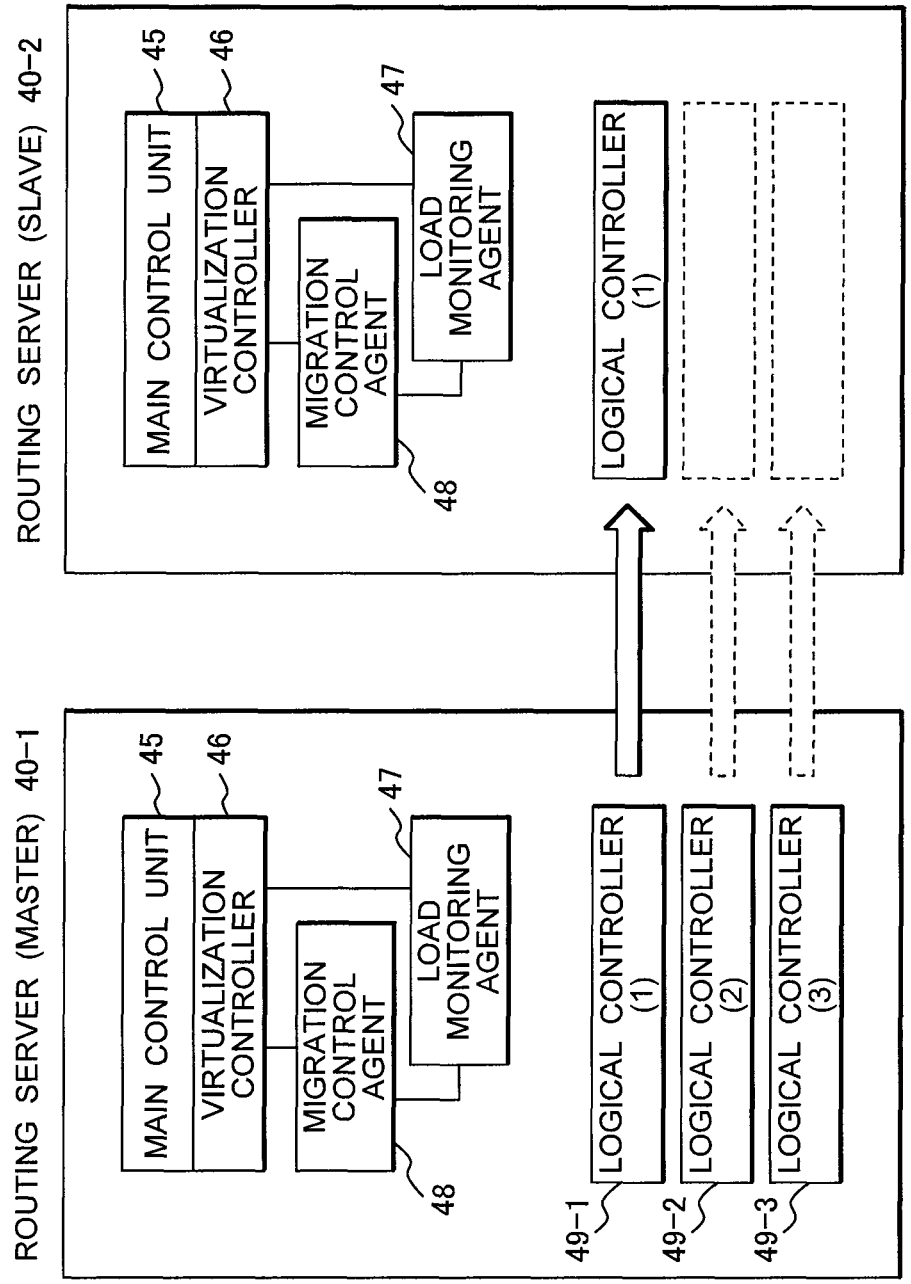
FIG. 12 schematically illustrates a method for migrating a logical controller 49 from a master routing server 40-1 to a slave routing server 40-2.

FIG. 12 schematically illustrates a migration method of one of logical controllers 49 from the master routing server 40-1 to the slave routing server 40-2.

For example, it is assumed that, due to an increase in the load on the logical controller 49-1 operating on the master routing server 40-1, the migration controller 59 in the system controller 50 issues migration commands for the logical controller 49-1 to the master routing server 40-1 and the slave routing server 40-2.

When the master routing server 40-1 receives the migration command from the system controller 50, the migration control agent 48 instructs the virtualization controller 46 to stop the logical controller 49-1 and to move the logical controller 49-1 to the slave routing server 40-2. The virtualization controller 46 of the master routing server stops the operation of the logical controller 49-1 and transfers configuration information (components 410-440 shown in FIG. 3) of the logical controller 49-1 stored in the memory 44B to the slave routing server 40-2 via the internal switch 300, as denoted by a solid-line arrow in FIG. 12.

At the slave routing server 40-2, when the migration command from the system controller 50 is received, the migration control agent 48 instructs the virtualization controller 46 to accept and activate the migrated logical controller 49-1. The virtualization controller 46 of the slave server stores the components of the logical controller 49-1 received from the master routing server via a system internal bus into the memory 44B and starts the operation of the logical controller 49-1 upon the completion of storing all the components into the memory 44B.

Migration of the logical controller from the master routing server 40-1 to the slave routing server 40-2 may be performed such that, instead of migrating the target logical controller 49-1 in a high load state, the other logical controllers (logical controllers 49-2, 49-3 in this example) in a relatively low load state are moved as denoted by dashed-line arrows in FIG. 12.

Because the logical controller 49-1 in a high load state is frequently communicating packets with the corresponding user node 60, if the logical controller 49-1 is selected as the migration target, it may happen that routing control packets transmitted by the user node 60 cannot be processed and would be lost during a period from the stop of the logical controller 49-1 on the master routing server 40-1 until the start of the logical controller 49-1 on the slave routing server 40-2.

In this case, if the master routing server 40-1 issues a migration request to move logical controllers other than the logical controller 49-1 as migration targets, it is possible to reduce the probability of routing control packet loss because the logical controllers under a relatively low load are moved from the master routing server 40-1 to the slave routing server 40-2. In the example shown in FIG. 12, all logical controllers other than the logical controller 49-1 migrate simultaneously. However, these logical controllers may be moved to the slave routing server 40-2 one by one, each time the migration request is issued.

Figure 13:
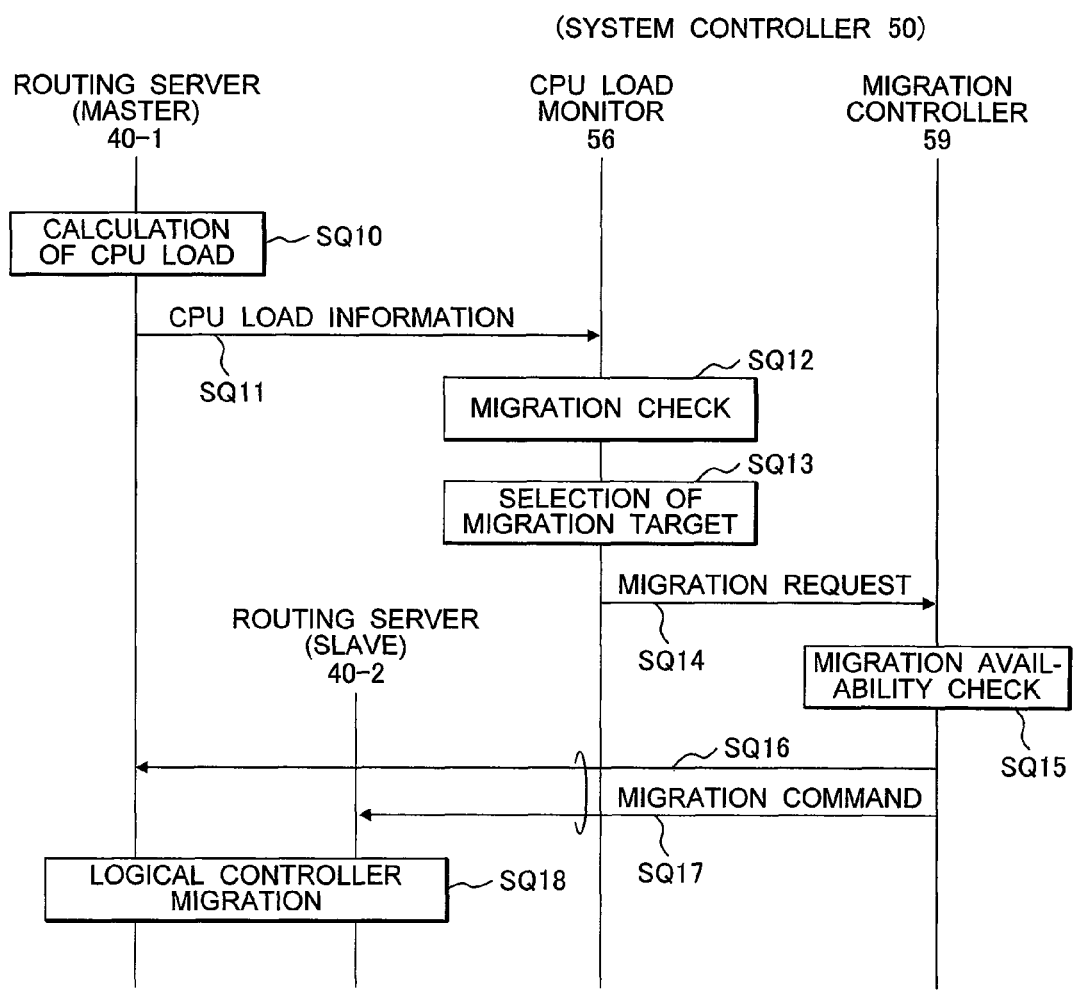
FIG. 13 is a sequence diagram illustrating migration of a logical controller to be executed in response to a migration request issued from a CPU load monitor 56.

FIG. 13 is a sequence diagram illustrating logical controller migration from the master routing server 40-1 to the slave routing server 40-2, which is executed in response to a migration request issued by the CPU load monitor 56 in the system controller 50.

The load monitoring agent 47 of the master routing server 40-1 periodically calculates the load of the CPU (processor) 41 and the CPU utilization rate for each logical controller (SQ10) and notifies the system controller 50 of them as CPU load information (SQ11). Upon receiving the CPU load information from the master routing server 40-1, the CPU load monitor 56 of the system controller 50 checks whether the condition for logical controller migration from the master routing server 40-1 to the slave routing server 40-2 is satisfied (migration check) (SQ12).

When the migration condition is not satisfied and the migration of a logical controller is determined not to be necessary, the CPU load monitor 56 waits for the next notification of CPU load information from the master routing server 40-1. If the migration condition is satisfied, the CPU load monitor 56 selects a target logical controller to be moved to the slave routing server 40-2 (SQ13) and issues a migration request to the migration controller 59 (SQ14).

Upon receiving the migration request from the CPU load monitor 56, the migration controller 59 checks surplus resources available on the slave routing server 40-2 by referring to the server resource management table 540, and determines whether the migration of the logical controller specified by the migration request is executable (migration availability check) (SQ15). Migration of the logical controller 49 from the master routing server 40-1 to the slave routing server 40-2 is executed only when sufficient surplus resources are available on the slave routing server 40-2.

When it is decided that the migration of a particular logical controller specified by the migration request from the master routing server 40-1 to the slave routing server 40-2 is executable, the migration controller 59 issues migration commands for the particular logical controller to the master routing server 40-1 and the slave routing server 40-2 (SQ16, SQ17). Upon receiving the migration command from the system controller 50, the master routing server 40-1 and the slave routing server 40-2 carry out migration of the particular logical controller, in cooperation with the migration control agent 48 and the virtualization controller 46 as described in regard to FIG. 12 (SQ18).

Figure 14:
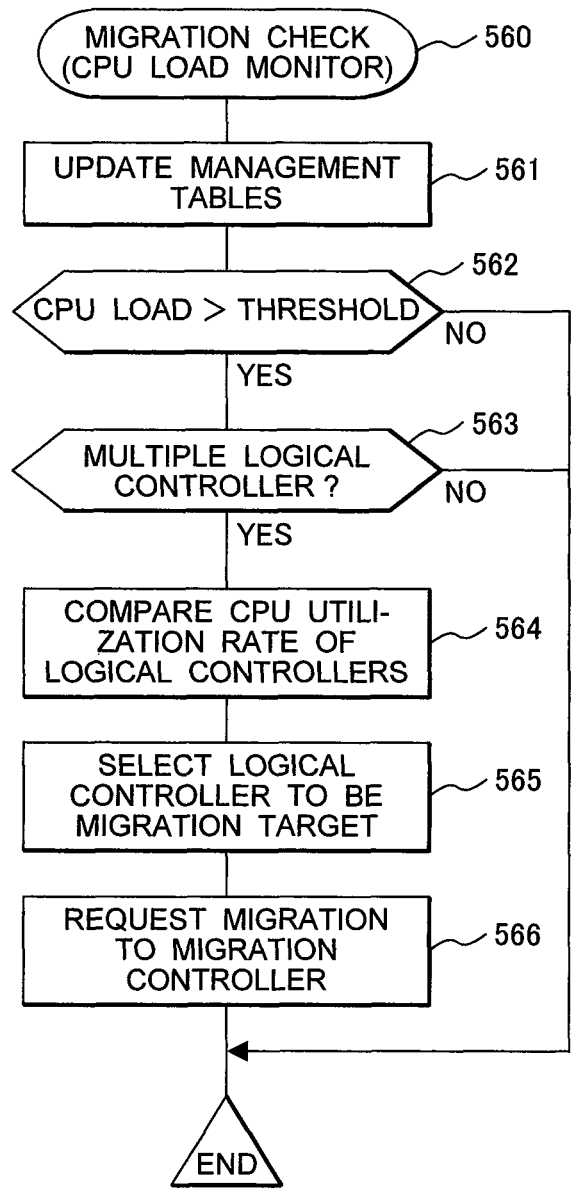
FIG. 14 is a flowchart of a migration check 560 to be executed by the CPU load monitor 56.

FIG. 14 shows a flowchart of a migration check 560 to be executed by the CPU load monitor 56 of the system controller 50 upon receiving CPU load information from the routing server 40-1.

The CPU load monitor 56 updates the CPU load management table 510 and the server resource management table 540 in accordance with the received CPU load information (561). After that, the CPU load monitor 56 compares the CPU load of the routing server (master 40-1), which is the source of the CPU load information, with a predefined threshold value (562). When the CPU load is equal to or less than the threshold value, the CPU load monitor 56 terminates the migration check 560 and waits for the next notification of CPU load information.

When the CPU load of the routing server 40-1 exceeds the threshold value, the CPU load monitor 56 checks the number of logical controllers 49 operating on the routing server 40-1, by referring to the server resource management table 540 shown in FIG. 6 (563). If the number of logical controllers is only one, CPU load monitor 56 terminates the migration check 560 and waits for the next notification of CPU load information.

If two or more logical controllers are operating on the routing server 40-1, the CPU load monitor 56 compares the respective CPU utilizations rates 544 stored in the server resource management table 540 to each other (564) and selects a logical controller to be a migration target (565). After that, the CPU load monitor issues a migration request for the logical controller having been selected in step 565 to the migration controller 59 (566) and terminates the current migration check 560.

In a case where the logical controller having the largest CPU utilization was selected as the migration target in step 565, for example, it is possible to perform the migration as denoted by the solid-line arrow in FIG. 12. In a case where the logical controller having the largest CPU utilization rate is left on the routing server 40-1 and the other logical controllers are selected as migration targets, it is possible to perform migration as denoted by the dashed-line arrows in FIG. 12.

Logical controller migration is performed for the purposes of reducing the CPU load of the master routing server 40-1 and lessening the influence on other logical controllers. Accordingly, in the case of leaving the logical controller having the largest CPU utilization rate on the master routing server 40-1, at least one logical controller may be selected from among the other logical controllers.

Figure 15:
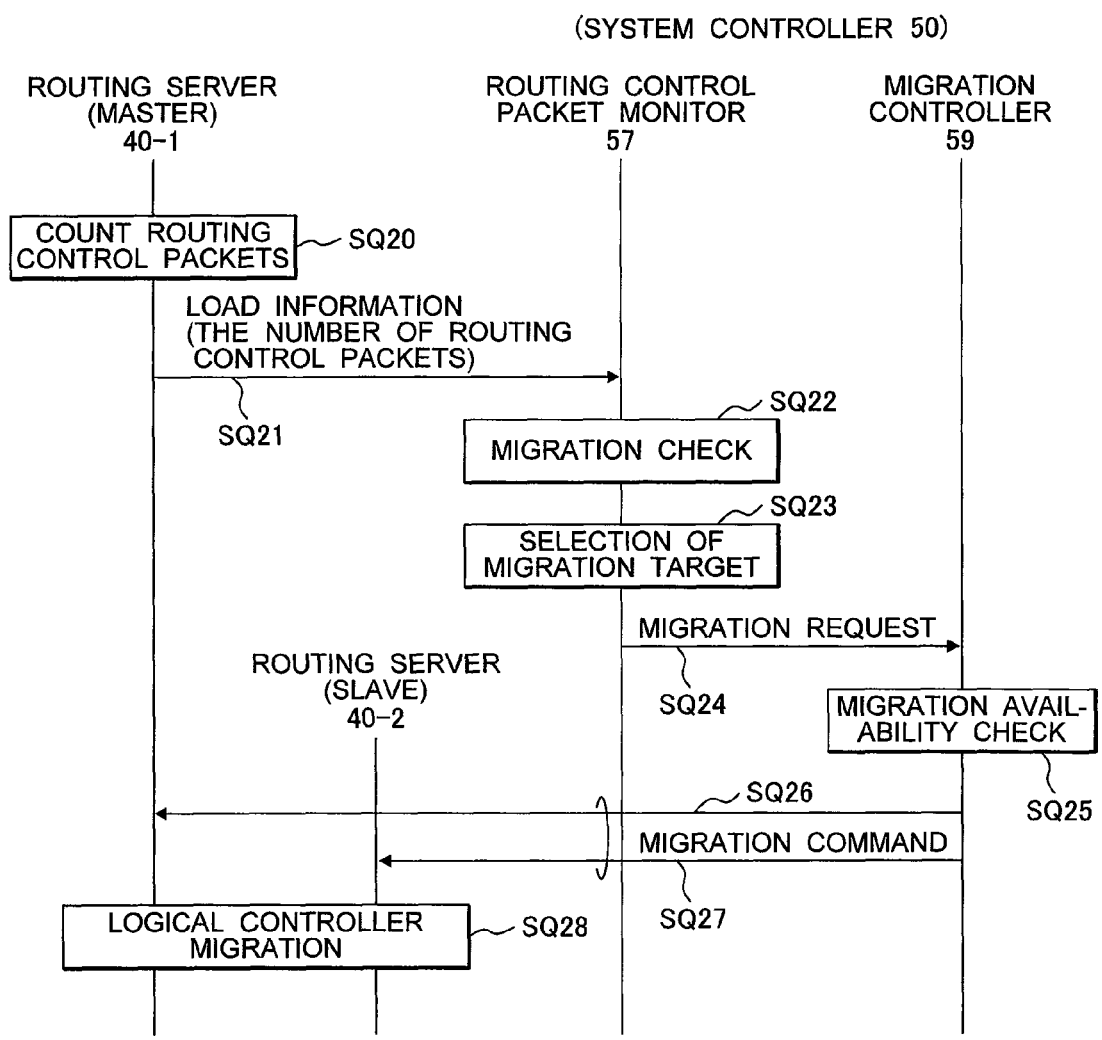
FIG. 15 is a sequence diagram illustrating migration of a logical controller to be executed in response to a migration request issued from a routing control packet monitor 57.

FIG. 15 is a sequence diagram illustrating logical controller migration from the master routing server 40-1 to the slave routing server 40-2, which is executed in response to a migration request issued from the routing control packet monitor 57 in the system controller 50. Here, the migration request is issued when the amount of routing control packets transmitted and received by the master routing server has increased.

On the master routing server 40-1, the routing control packet monitoring agent 430 in each logical controller 49 counts the number of routing control packets transmitted and received by the logical controller for a given period of time (SQ20). The number of routing control packets monitored by each logical controller is periodically notified as load information to the system controller 50 by the load monitoring agent 47 of the server 40-1 (SQ21).

Upon receiving the number of routing control packets for each logical controller as the load information from the routing server 40-1, the routing control packet monitor 57 of the system controller 50 checks whether a condition for logical controller migration from the master routing server 40-1 to the slave routing server 40-2 is satisfied (SQ22).

When the migration condition is not satisfied and the migration of a logical controller is determined not to be necessary, the routing control packet monitor 57 waits for the next notification of load information from the master routing server 40-1. If the migration condition is satisfied, the routing control packet monitor 57 selects a target logical controller to be moved to the slave routing server 40-2 (SQ23) and issues a migration request to the migration controller 59 (SQ24).

Upon receiving the migration request from the routing control packet monitor 57, the migration controller 59 determines whether the migration of the logical controller is executable (SQ25), as described in regard to FIG. 13. When it is decided that the migration of a particular logical controller specified by the migration request from the master routing server 40-1 to the slave routing server 40-2 is executable, the migration controller 59 issues migration commands for the particular logical controller to the master routing server 40-1 and the slave routing server 40-2 (SQ26, SQ27). Upon receiving the migration command from the system controller 50, the master routing server 40-1 and the slave routing server 40-2 carry out migration of the particular logical controller, in cooperation with the migration control agent 48 and the virtualization controller 46, as described in regard to FIG. 12 (SQ28).

Figure 16:
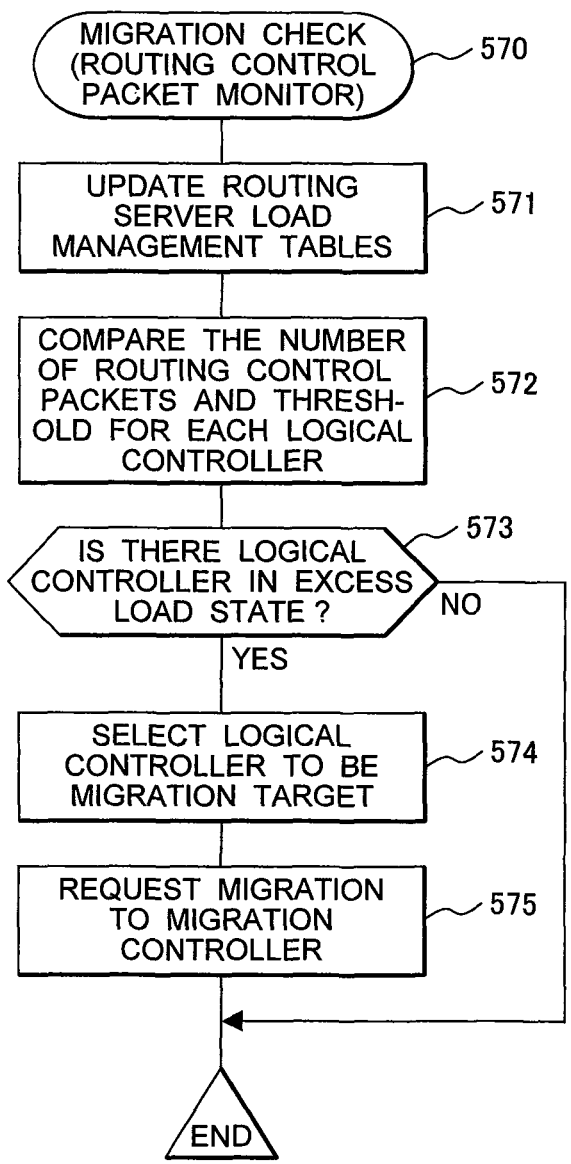
FIG. 16 is a flowchart for a migration check 570 to be executed by the routing control packet monitor 57.

FIG. 16 shows a flowchart of a migration check 570 to be executed by the routing control packet monitor 57 in the system controller 50 upon receiving the load information indicating the number of routing control packets for each logical controller from the routing server 40-1.

The routing control packet monitor 57 updates the routing server load management table 520 in accordance with the load information received from the routing server 40-1 (571). After that, the routing control packet monitor 57 compares the number of routing control packets for each logical controller with a predefined threshold value (572). If there is no logical controller for which the number of routing control packets exceeds the threshold value (573), the routing control packet monitor 57 terminates the migration check 570 and waits for the reception of next load information.

When a logical controller for which the number of routing control packets exceeds the threshold value is found (573), the routing control packet monitor 57 selects a logical controller to be a migration target (574), issues a migration request for the logical controller having been selected in step 574 to the migration controller 59 (575), and terminates the current migration check 570.

In a case where the logical controller for which the number of routing control packets exceeds the threshold value was selected as the migration target in step 574, it is possible to perform the migration as denoted by the solid-line arrow in FIG. 12. In a case where the logical controller for which the number of routing control packets exceeds the threshold value is left on the routing server 40-1 and the other logical controllers are selected as migration targets, it is possible to perform migration as denoted by the dashed-line arrows in FIG. 12.

Figure 17:
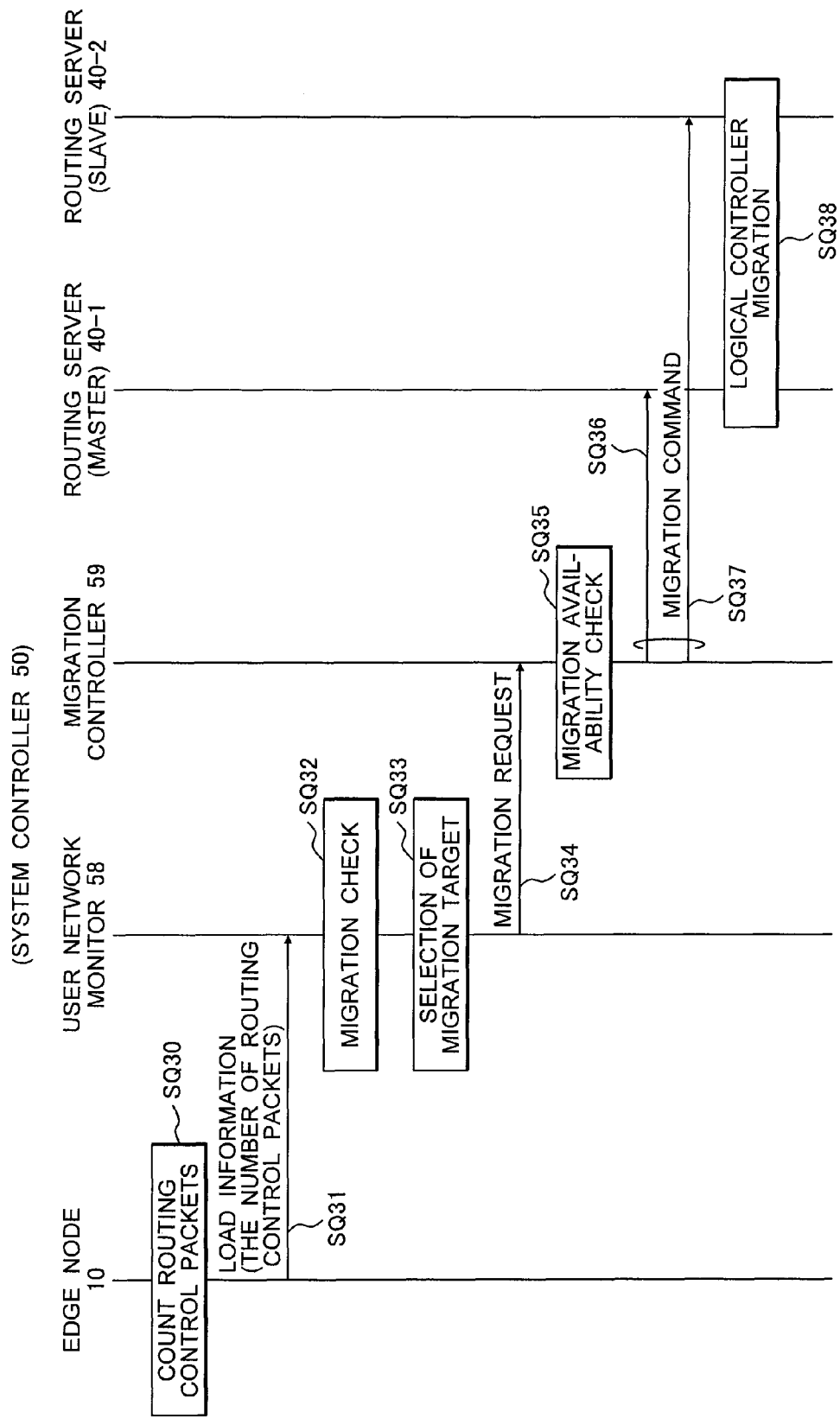
FIG. 17 is a sequence diagram illustrating migration of a logical controller to be executed in response to a migration request issued by a user network monitor 58.

FIG. 17 is a sequence diagram illustrating logical controller migration from the master routing server 40-1 to the slave routing server 40-2, which is executed in response to the migration request issued from the user network monitor 58 in the system controller 50. Here, the migration request is issued when the amount of routing control packets transmitted and received by the edge node 10 has increased.

Each edge node 10 counts the number of routing control packets transmitted and received for a given period of time (SQ30) and periodically transmits load information indicating the number of routing control packets to the system controller 50 (SQ31). Upon receiving the load information indicating the number of transmitted and received routing control packets from each edge node 10, the user network monitor 58 of the system controller 50 checks whether a condition for logical controller migration from the master routing server 40-1 to the slave routing server 40-2 is satisfied (SQ32). When the migration condition is not satisfied and the migration of a logical controller is determined not to be necessary, the user network monitor 58 waits for the next notification of load information. If the migration condition is satisfied, the user network monitor 58 selects a target logical controller to be moved to the slave routing server 40-2 (SQ33) and issues a migration request to the migration controller 59 (SQ34).

Upon receiving the migration request from the user network monitor 58, the migration controller 59 determines whether the migration of the logical controller is executable (SQ35), as described in regard to FIG. 13. When it is decided that the migration of a particular logical controller specified by the migration request from the master routing server 40-1 to the slave routing server 40-2 is executable, the migration controller 59 issues migration commands for the particular logical controller to the master routing server 40-1 and the slave routing server 40-2 (SQ36, SQ37).

Upon receiving the migration command from the system controller 50, the master routing server 40-1 and the slave routing server 40-2 carry out migration of the particular logical controller, in cooperation with the migration control agent 48 and the virtualization controller 46, as described in regard to FIG. 12 (SQ38).

FIG. 18 shows an example of a format of a load information notification packet 120 to be transmitted from the edge node 10 to the system controller 50.

The load information notification packet 120 transmitted from the edge node 10 includes the identifier 121 of the source edge node 10 and load information for each logical interface. The load information for each logical interface indicates, in association with an interface ID 122, routing protocol type 123, and input count 124 and output count 125 of routing control packets.

Although a packet format specific to the present embodiment is adopted here as the load information notification packet 120, a message format specified by a packet sampling, such as sFlow protocol, or a packet statistics reporting protocol may be used for the load information notification packet 120. In a case where each user node 10 notifies the user network monitor 58 in the system controller 50 of the amount of transmitted and received routing control packets only, it is able to reduce the size of reporting packet by using the counter information in the sFlow protocol.

FIG. 19 shows an example of a structure of the user network destination management table 530 to be referred to by the user network monitor 58.

The user network destination management table 530 is prepared for each edge node in the carrier network SNW. The user network monitor 58 is able to correlate a load information notification packet 120 received from each edge node to a user network, by referring to the user network destination management table 530.

The user network destination management table 530 comprises a plurality of table entries, each having an interface ID 531 to identify a logical network interface of each edge node. Each table entry includes a physical port ID 532 indicating a physical network interface corresponding to the interface ID 531, a logical controller ID 533 which is the identifier of a logical controller to perform routing for a user network connected to the physical network interface, and an identifier (VPN ID) 534 to uniquely identify the user network.

The user network destination management table 530 shown here indicates that two logical interfaces having the interface IDs "VLAN001" and "VLAN002" are formed on a physical interface having the physical port ID="Ether001" and a logical interface having the interface ID "Ether002" is formed on a physical interface having the physical port ID="Ether002". It can also be seen that user networks having VPN IDs="a", "b", "c" are connected to these three logical interfaces, respectively, and routing for these user networks is controlled by logical controllers having logical controller IDs of "1", "2", "3", respectively.

Figure 20:
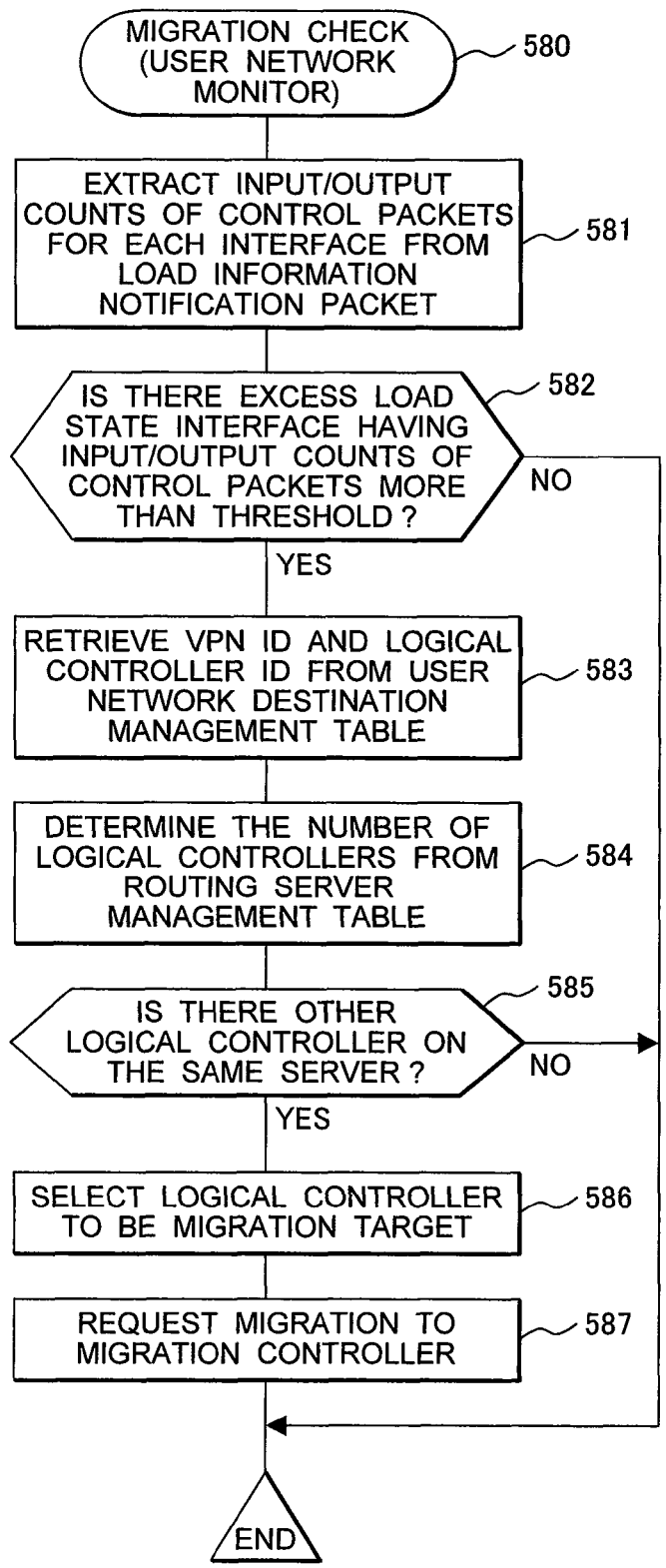
FIG. 20 is a flowchart of a migration check 580 to be executed by the user network monitor 58.

FIG. 20 shows a flowchart of a migration check 580 to be executed by the user network monitor 58 of the system controller 50 when a load information notification packet 120 is received from the edge node 10.

The user network monitor 58 extracts the input and output counts of routing control packets for each interface of the source edge node from the load information notification packet 120 received from the edge node 10 (581). By comparing the packet counts with a predefined threshold value, the user network monitor 58 determines whether there is an interface for which the input and output counts of routing control packets exceed the threshold value (582). If there is no interface for which the input and output counts of routing control packets exceed the threshold value, the user network monitor 58 terminates the current migration check and waits for the reception of the next load information notification packet.

If there is an interface for which the input and output counts of routing control packets exceed the threshold value, the user network monitor 58 specifies the identifier (VPN-ID) of a user network connected to the interface and the ID of a logical controller to be the destination of routing control packets, by searching the user network destination management table 530 for a table entry having the interface ID 531 matched with the ID of the interface (583)

Next, the user network monitor 58 refers to the routing server management table 550 and determines the number of logical controllers operating on the routing server (the master routing server 40-1 in this example) associated with the identifier (VPN-ID) of the user network connected to the interface (584). The number of logical controllers operating on the same routing server can be specified from the number of table entries having the same routing server ID registered in the routing server management table 550.

The user network monitor 58 checks the number of logical controllers operating on the same routing server (585). If the number of logical controller is only one, the user network monitor 58 terminates the current migration check. If a plurality of logical controllers are operating on the same routing server, the user network monitor 58 selects a logical controller to be the migration target from among the logical controllers (586), issues a migration request for the selected controller to the migration controller 59 (587), and terminates the migration check.

In a case where a logical controller having the logical controller ID specified in step 583 is selected as the migration target in step 586, it is possible to perform the migration as denoted by the solid-line arrow in FIG. 12. In a case where the other logical controllers are selected as migration targets, it is possible to perform the migration as denoted by the dashed-line arrows in FIG. 12.

Second Embodiment

Figure 21:
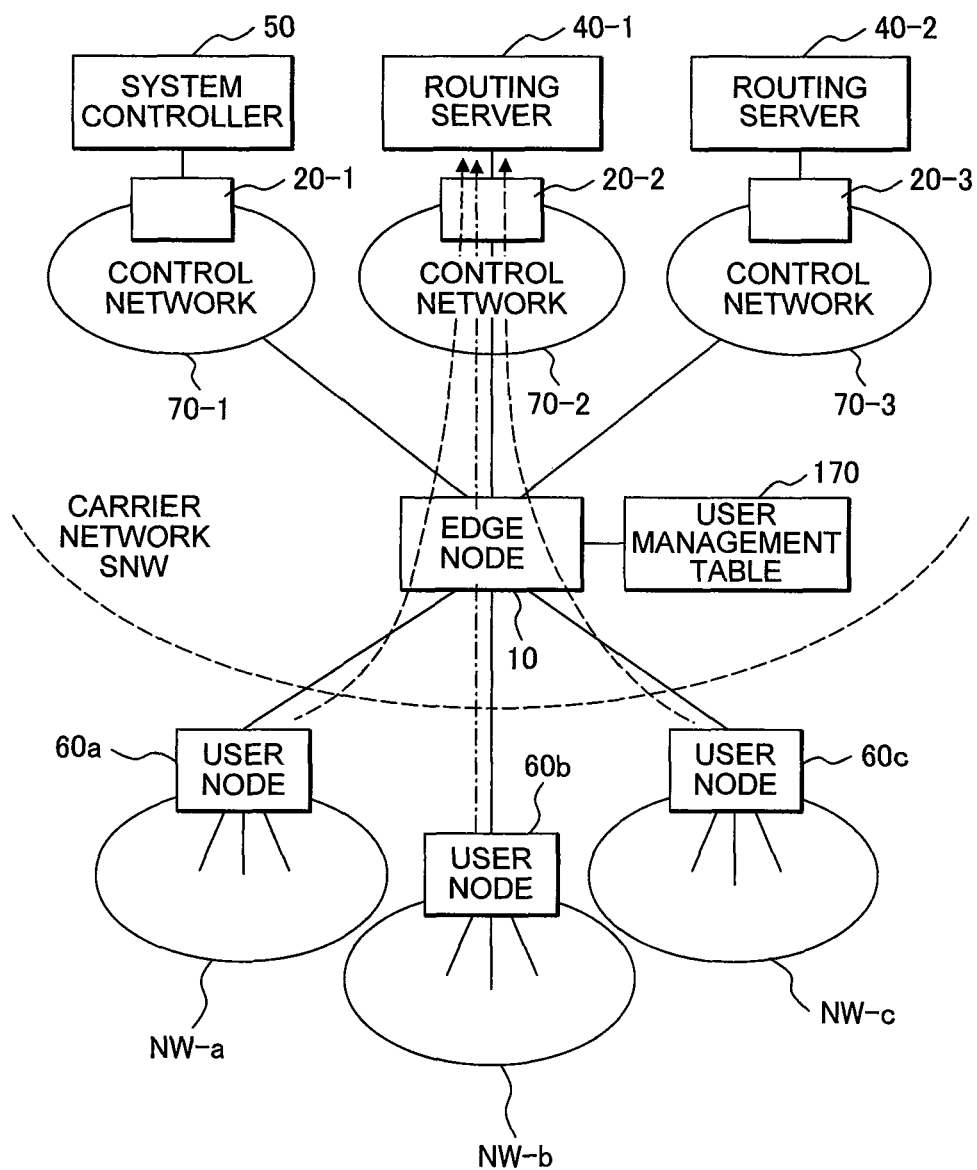
FIG. 21 shows a second embodiment of a communication network to which the present invention is applied.

FIG. 21 shows a second embodiment of a communication network to which the present invention is applied.

In the communication network of the first embodiment, since a plurality of routing servers 40-1 and 40-2 forming the routing control system 30 are connected by the internal switch 300 and located in the same IP segment, the slave routing server 40-2 can inherit the IP address of the migrated logical controller, without changing the route setting at the core node 20 or the internal switch 300.

In the communication network of the second embodiment, a plurality of routing servers 40-1 and 40-2 forming the routing system 30 are separately located at different sites distant from each other. In the communication network shown here, the system controller 50 is connected to a core node 20-1 in a control network 70-1, the master routing server 40-1 is connected to a core node 20-2 in a control network 70-2, and the slave routing server 40-2 is connected to a core node 20-3 in a control network 70-3. These control networks 70-1 to 70-3 are connected to an edge node 10 in the carrier network.

According to this network configuration, because the connection point of the master routing server 40-1 and the connection point of the slave routing server 40-2 belong to IP segments different from each other, when a logical controller has migrated from the master routing server 40-1 to the slave routing server 40-2, the slave routing server 40-2 cannot inherit the previous IP address of the migrated logical controller.

In the second embodiment, therefore, the slave routing server 40-2 assigns a new IP address to a migrated logical controller moved from the master routing server 40-1. Further, the edge node is provided with a user management table 170 for indicating the correspondence of the VPN IDs with any routing server IP address, so that the routing control packet transmitted from a user network can be forwarded correctly to a corresponding logical controller, even after the logical controller has migrated from the master routing server 40-1 to the slave routing server 40-2.

In the second embodiment, the master routing server 40-1, the slave routing server 40-2, and the system controller 50 perform communication of migration command and the migration of the logical controller via a network interface 42 or 52.

Before executing the migration of a logical controller, user networks NW-a, NW-b and NW-c are associated with logical controllers on the master routing server, respectively. Thus, routing control packets transmitted from user nodes 60a, 60b and 60c are forwarded to the master routing server via the edge node 10 and the control network 70-2, as denoted by dashed lines in FIG. 21.

Figure 22:
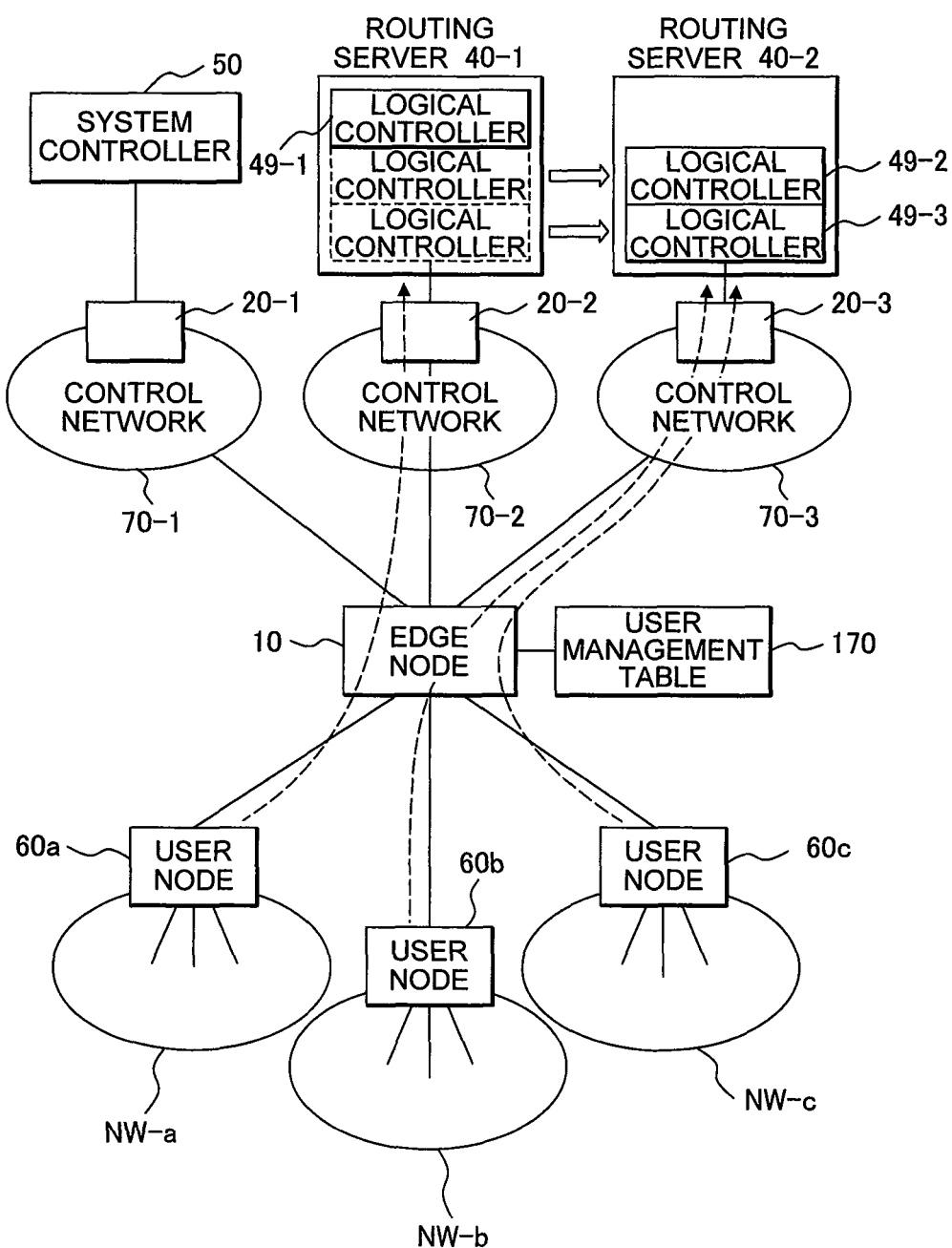
FIG. 22 illustrates a state in which logical controllers 49-2 and 49-3 have migrated in the second embodiment.

FIG. 22 shows the state in which two logical controllers 49-2 and 49-3 have migrated from the master routing server 40-1 to the slave routing server 40-2.

When the logical controllers 49-2 and 49-3 have migrated from the master routing server 40-1 to the slave routing server 40-2 in a state where the user networks NW-a, NW-b and NW-c are associated with the logical controllers 49-1, 49-2 and 49-3, respectively, routing control packets transmitted from the user nodes 60b and 60c are forwarded to the corresponding logical controllers on the slave routing server via the edge node 10 and the control network 70-3, as denoted by dashed lines in FIG. 22. Switching of forwarding routes for these routing control packets is realized by changing the contents of the user management table on the edge node 10 in association with the migration.

FIG. 23A and FIG. 23B illustrate the contents of the user management table 170 provided in the edge node 10.

The user management table 170 comprises a plurality of table entries, each entry indicating the correspondence among a VPN ID 171 which is the identifier of a user network, IP address 172 of a routing server to be the destination of routing control packets, and a user port ID indicating a port of the edge node 10, through which a user network (user node 60) is connected to the carrier network.

Upon receiving a routing control packet from a user node 60 (60a, 60b, 60c), the edge node 10 searches the user management table 170 for a table entry corresponding to the port ID of the port having received the routing control packet, specifies the IP address of the routing server to be the destination of the routing control packet, and forwards the routing control packet to the routing server corresponding to the user network to which the user node belongs.

FIG. 23A shows the user management table 170 before executing the migration. At this time, as indicated by the entries EN-01 to EN-03, three user networks having VPN IDs "a", "b" and "c" are associated with the same IP address "192.168.99.1" indicating the master routing server 40-1. Therefore, the edge node 10 forwards all routing control packets received from the user networks NW-a, NW-b and NW-c to the master routing server 40-1, as shown in FIG. 21.

FIG. 23B shows the user management table 170 after migrating the logical controllers 49-2 and 29-3 corresponding to the user networks NW-b and NW-c to the slave routing server 40-2, as described in regard to FIG. 22. In consequence of the migration, the routing server IP address 172 of the table entries EN-02 and EN-03 was rewritten to the IP address "192.168.100.1" of the slave routing server 40-2.

FIG. 24 is a sequence diagram illustrating the migration of a logical controller from the master routing server 40-1 to the slave routing server 40-2, which is performed in response to a migration request issued from the user network monitor 58 of the system controller 50, in the communication network of the second embodiment.

Steps SQ30 through SQ38 are the same as SQ30 through SQ38 described in regard to FIG. 17. In the second embodiment, migration commands (SQ36, SQ37) are transmitted from the migration controller 59 of the system controller 50 to the master and slave routing servers 40-1 and 40-2 via the network interface 52.

In the second embodiment, the migration controller 59 instructs the slave routing server 40-2 to execute the migration of a particular logical controller and changing of the IP address of the logical controller by means of the migration command (SQ37). After that, the migration controller 59 searches the routing server management table 550 for the identifier (VPN ID) of the user network corresponding to the logical controller to be the migration-target to specify the IP address of the edge node 10 accommodating the user network (edge node check) (SQ39). Then, the migration controller 59 transmits to the edge node 10 an address change request command to change the routing server IP address corresponding to the VPN ID to the IP address of the slave routing server 40-2 (SQ40). In response to the address change request command, the edge node 10 updates the user management table (SQ41) and operates to forward routing control packets received thereafter from the user network, in accordance with the updated user management table 170.

Upon completing the migration of the logical controller (SQ38) specified by the migration command, the slave routing server 40-2 assigns the migrated logical controller an IP address of the IP segment to which the slave routing server 40-2 belongs (SQ42) and notifies the migration controller 59 in the system controller 50 of the new IP address assigned to the logical controller (SQ43). The migration controller 59 updates the logical controller address 553 in the routing server management table 550, in accordance with the IP address notified from the slave routing server 40-2 (SQ44).

Although the sequence of migration to be executed in response to a migration request issued from the user network monitor 58 has been described here as the second embodiment, it is also possible to perform migration, in the communication network shown in FIG. 21, in response to a migration request issued as a result of a migration check executed by the CPU load monitor 56 or a migration request issued as a result of a migration check executed by the routing control packet monitor 57, as described for the first embodiment.

What is claimed is:

1. A routing control system to be located in a Virtual Private Network (VPN) service network connected to a plurality of user networks, comprising:
    a system controller;
    a first routing server; and
    a second routing server;
    wherein said first routing server includes a plurality of logical controllers, each of which is associated with one of said plurality of user networks to perform routing control for the one of said user networks,
    wherein said system controller monitors a load state of said first routing server and migrates at least one logical controller selected out of said plurality of logical controllers operating on said first routing server from the first routing server to said second routing server when the load state has satisfied a predetermined condition, so that the second routing server inherits routing control for the respective at least one of said user networks associated with the migrated at least one logical controller by activating the migrated at least one logical controller,
    wherein said system controller includes a routing control packet monitor which obtains load information including the amount of routing control packets for each of said logical controllers from said first routing server to determine whether the amount of routing control packets for any one of said logical controllers has reached a predefined threshold value, and
    wherein, when the amount of routing control packets has reached the predefined threshold value, said routing control packet monitor selects said at least one logical controller out of said plurality of logical controllers operating on said first routing server and issues a migration request for the selected at least one logical controller to a migration controller.

2. A routing control system to be located in a VPN service network connected to a plurality of user networks, comprising:

a system controller;
a first routing server; and
a second routing server;
wherein said first routing server includes a plurality of logical controllers, each of which is associated with one of said plurality of user networks to perform routing control for the one of said user networks;
wherein said system controller obtains load information indicating an amount of routing control packets from edge nodes to which said user networks are connected and migrates at least one logical controller selected out of said plurality of logical controllers operating on said first routing server from the first routing server to said second routing server when the amount of routing control packets has satisfied a predetermined condition; and
wherein said second routing server inherits routing control for the respective at least one of said user networks associated with the migrated at least one logical controller by activating the migrated at least one logical controller.

3. The routing control system according to claim 1, wherein the first routing server is a master routing server, and the second routing server is a slave routing server.

4. The routing control system according to claim 2, wherein the first routing server is a master routing server, and the second routing server is a slave routing server.

5. The routing control system according to claim 1, wherein the first routing server receives routing control packets transmitted from one or more communication nodes in said user networks, and distributes new routing information to one or more communication nodes in said VPN service network, and wherein each of the logical controllers is used to manage routing information for the associated one of the user networks and generate new routing information to perform routing control for the associated one of the user networks.

6. The routing control system according to claim 2, wherein the first routing server receives routing control packets transmitted from one or more communication nodes in said user networks, and distributes new routing information to one or more communication nodes in said VPN service network, and wherein each of the logical controllers is used to manage routing information for the associated one of the user networks and generate new routing information to perform routing control for the associated one of the user networks.

7. The routing control system according to claim 1, wherein said system controller includes a migration controller which issues migration commands for said selected at least one logical controller to said first routing server and said second routing server, and
wherein, in response to said migration commands from said migration controller, said first routing server transfers said selected at least one logical controller to said second routing server and said second routing server activates the migrated at least one logical controller to inherit routing control for the respective at least one of said user networks.

8. The routing control system according to claim 7, wherein said system controller includes a CPU load monitor which obtains CPU load information from said first routing server to determine whether a CPU load has reached a predefined threshold value, and
wherein, when the CPU load has reached the predefined threshold value, said CPU load monitor selects said at least one logical controller out of said plurality of logical controllers operating on said first routing server and issues a migration request for the selected at least one logical controller to said migration controller.

9. The routing control system according to claim 1, wherein said migration controller determines whether the migration of said selected at least one logical controller is allowed or not when said migration request was received, and issues migration commands for the at least one logical controller to said first routing server and said second routing server when the migration of the at least one logical controller is allowed.

10. The routing control system according to claim 1, wherein said first routing server, said second routing server and said system controller are connected to a core node in said VPN service network, and said migration of said at least one logical controller is carried out via the core node or an internal switch for interconnecting the first and second routing servers.

11. The routing control system according to claim 1, wherein said VPN service network includes a plurality of core nodes, and
wherein said first routing server and said second routing server are connected to different core nodes in said VPN service network, and said migration of said at least one logical controller is carried out via a communication line in the VPN service network.

12. The routing control system according to claim 11, wherein said plurality of user networks are connected to an edge node in the VPN service network,
wherein the edge node forwards routing control packets received from each of said user networks, in accordance with a management table indicating the correspondence of identifiers of said user networks and addresses of said first and second routing servers, and
wherein said system controller issues a command for updating the management table to said edge node when said at least one logical controller has migrated from said first routing server to said second routing server.

13. The routing control system according to claim 2, wherein said system controller includes a migration controller which issues migration commands for said selected at least one logical controller to said first routing server and said second routing server, and
wherein, in response to the migration commands from the migration controller, said first routing server transfers the selected at least one logical controller to said second routing server and said second routing server activates the transferred at least one logical controller to inherit routing control for the respective at least one of said user networks.

14. The routing control system according to claim 13, wherein said system controller includes a user network monitor which obtains load information indicating the amount of routing control packets from said edge nodes to determine whether the amount of routing control packets has reached a predefined threshold value, and
wherein said user network monitor selects said at least one logical controller out of said plurality of logical controllers operating on said first routing server and issues a migration request for the selected at least one logical controller to said migration controller when the amount of routing control packets has reached a predefined threshold value.

15. The routing control system according to claim 14, wherein said migration controller determines whether the migration of said selected at least one logical controller is allowed or not when said migration request was received, and issues migration commands for the at least one logical controller to said first routing server and said second routing server when the migration of the selected at least one logical controller is allowed.

16. The routing control system according to claim 2, wherein said first routing server, said second routing server and said system controller are connected to a core node in said VPN service network, and said migration of logical controller is carried out via the core node or an internal switch for interconnecting the first and second routing servers.

17. The routing control system according to claim 2, wherein said VPN service network includes a plurality of core nodes, and wherein said first routing server and said second routing server are connected to different core nodes in said VPN service network, and said migration of said at least one logical controller is carried out via a communication line in the VPS service network.

18. A routing control system to be located in a Virtual Private Network (VPN) service network connected to a plurality of user networks, comprising:
   a system controller;
   a first routing server;
   a second routing server;
   wherein said first routing server and said second routing server distribute route information to each of a plurality of communication nodes in said VPN service network,
   wherein said first routing server includes a plurality of logical controllers, and
   each of said logical controllers comprises at least:
     a route calculating unit which handles routing control packets transmitted from one of the communication nodes in one of the user networks, and generates new route information to be distributed to each of said communication nodes in said VPN service network; and
     a route table which is updated by said routing control packets, wherein each of said logical controllers is associated with one of said plurality of user networks to perform routing control for the one of said user networks; and
   wherein said system controller monitors a load state of said first routing server and migrates at least one logical controller selected out of said plurality of logical controllers operating on said first routing server from the first routing server to said second routing server when the load state has satisfied a predetermined condition, so that in said migrated at least one logical controller, the second routing server inherits routing control for the respective at least one user network associated with the migrated at least one logical controller by activating the migrated at least one logical controller.

* * * * *